United States Patent [19]

Yamamoto et al.

[11] Patent Number: 5,136,401
[45] Date of Patent: Aug. 4, 1992

[54] IMAGE LAYOUT APPARATUS FOR PERFORMING PATTERN MODIFICATION SUCH AS COLORING OF AN ORIGINAL IMAGE

[75] Inventors: Naofumi Yamamoto, Tokyo; Haruko Kawakami, Funabashi; Hidekazu Sekizawa, Yokohama, all of Japan

[73] Assignee: Kabushiki Kaisha Toshiba, Kawasaki, Japan

[21] Appl. No.: 623,534

[22] Filed: Dec. 7, 1990

[30] Foreign Application Priority Data

Dec. 8, 1989 [JP] Japan .................. 1-317855
Dec. 21, 1989 [JP] Japan .................. 1-329702

[51] Int. Cl.⁵ ............................... H04N 1/04
[52] U.S. Cl. ............................... 358/474
[58] Field of Search ............ 358/474, 462, 488, 222, 358/75

[56] References Cited

U.S. PATENT DOCUMENTS 4,673,989  6/1987  Yamada et al. ............ 358/450
4,705,390  11/1987  Kasahara et al. .......... 358/474
4,918,541  4/1990  Ishida et al. ............ 358/467
4,980,781  12/1990  Yamamoto et al. ......... 358/474

FOREIGN PATENT DOCUMENTS 60-204177  2/1985  Japan .
61-154357  9/1986  Japan .
63-114373  5/1988  Japan .
63-286069  7/1988  Japan .

OTHER PUBLICATIONS

The Journal of the Institute of Image Electronics Engineers of Japan; vol. 17, pp. 328–336; Nishimura et al.; 1988.

Primary Examiner—Stephen Brinich
Attorney, Agent, or Firm—Oblon, Spivak, McClelland, Maier & Neustadt

[57] ABSTRACT

An image layout apparatus for recognizing a color frame selectively marked on an original image, and automatically laying out the original image includes a color frame discriminating circuit for discriminating an image signal corresponding to the color frame from an image signal corresponding to the original image, a to-be-laid-out image signal outputting circuit for extracting a specific image signal corresponding to a specific image defined by the color frame from the original image signal, and outputting the specific image signal as a to-be-laid-out image signal, and a layout processing circuit for performing predetermined layout processing such as coloring layout of the to-be-laid-out image signal in accordance with the color frame image signal.

12 Claims, 16 Drawing Sheets

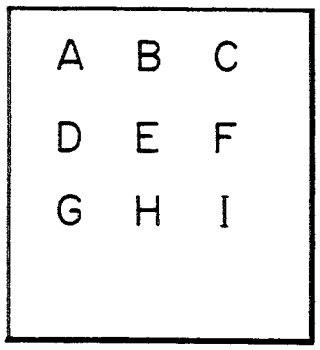 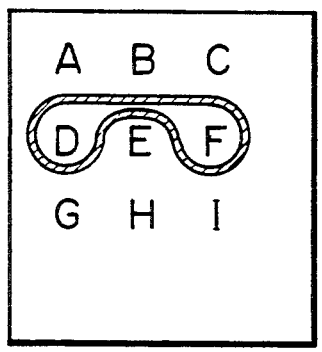 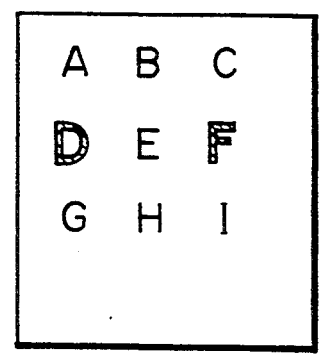
FIG. 2A  FIG. 2B  FIG. 2C
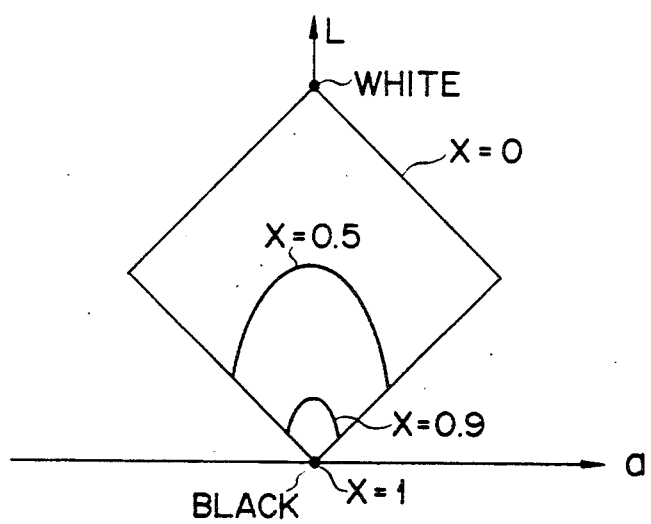
FIG. 3

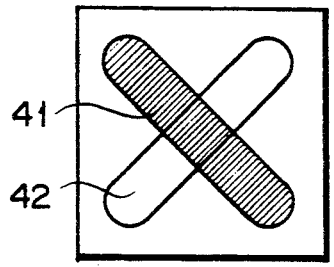
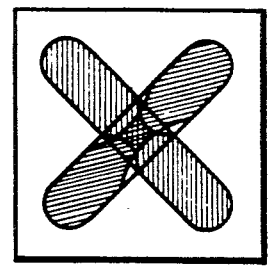
FIG. 4A  FIG. 4B
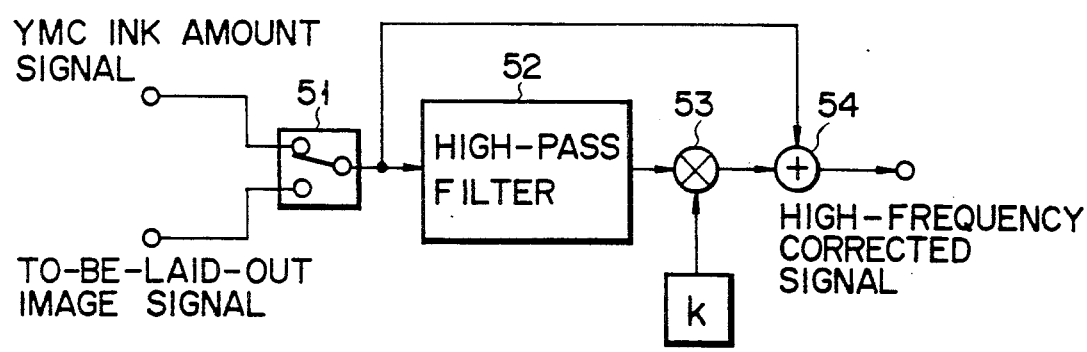
FIG. 5

| TO-BE-LAID-OUT IMAGE SIGNAL | AREA COLOR OF INPUT SIGNAL | OUTPUT SIGNAL | | | |
|---|---|---|---|---|---|
| | | Y | M | C | K |
| X | RED | X | X | — | — |
| X | GREEN | X | — | X | — |
| X | BLUE | — | — | X | — |
| X | YELLOW | X | — | — | — |
| X | BLACK | — | — | — | X |

F I G. 12

| TO-BE-LAID-OUT IMAGE SIGNAL | AREA COLOR OF INPUT SIGNAL | OUTPUT SIGNAL | | | |
|---|---|---|---|---|---|
| | | Y | M | C | K |
| X | RED | X | X | — | — |
| X | GREEN | X | — | X | — |
| X | BLUE | — | — | X | — |
| X | YELLOW | X | — | — | — |
| X | BLACK | X | X | X | X |

F I G. 13

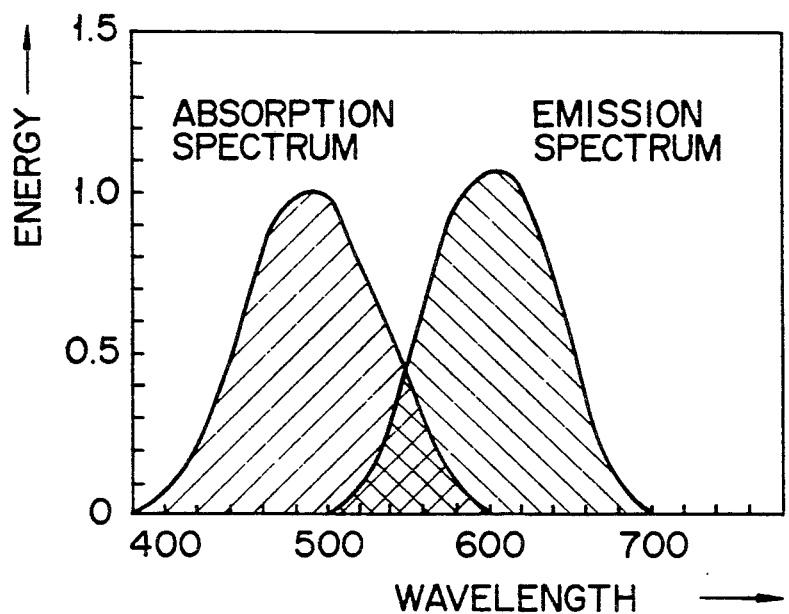
F I G. 15
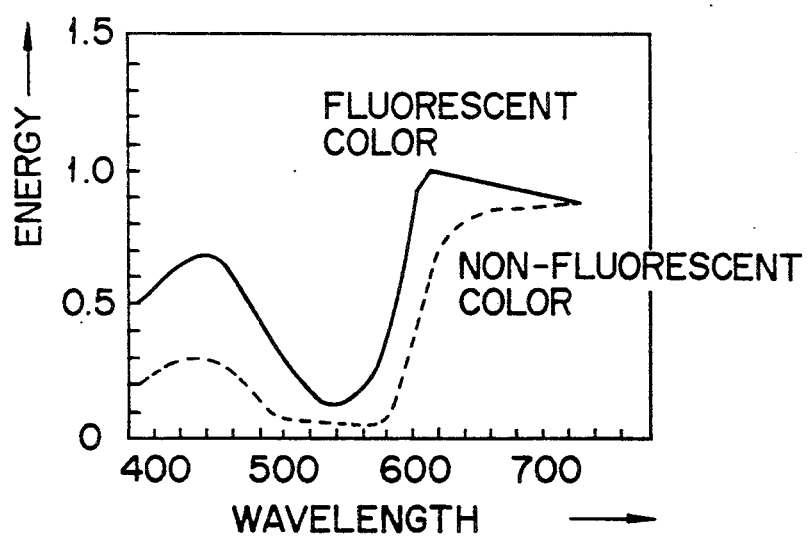
F I G. 16

RED

GREEN

YELLOW

MAZENTA

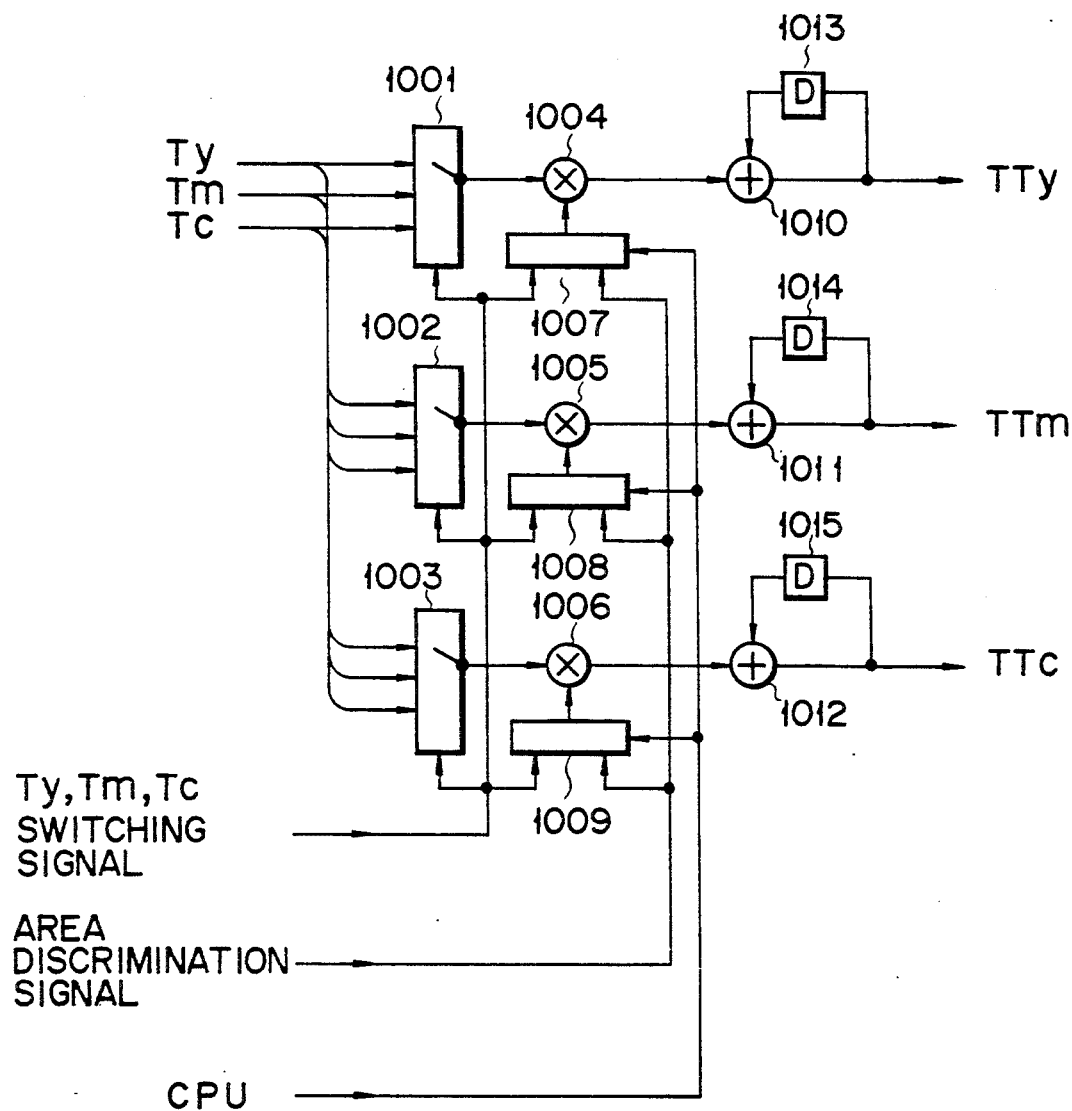
F I G. 23

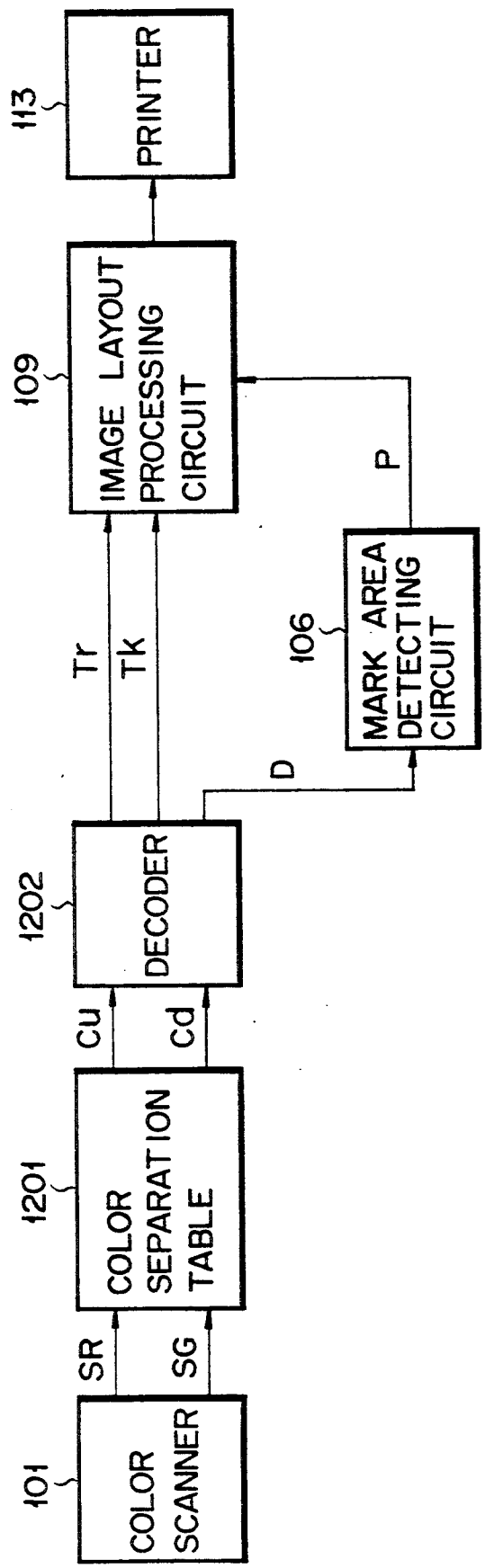
F I G. 25

IMAGE LAYOUT APPARATUS FOR PERFORMING PATTERN MODIFICATION SUCH AS COLORING OF AN ORIGINAL IMAGE

Background of the Invention

1. Field of the Invention

The present invention relates to an image layout apparatus and, more particularly, to an image layout apparatus for performing a layout, e.g., coloring, a modification of a pattern, and the like, of an original image in accordance with mark image data designated by, e.g., a color frame mark on the original image.

2. Description of the Related Art

A system for editing a monochromatic original image using a color mark is known ("Original Editing System Using Facsimile" Society of Electronics and Communications Letters, '80/12 Vol. J63-D 12). In this system, a color mark designating a content to be laid out is written on a black-and-white image a color mark using a red ink, a mark portion is discriminated from an image signal obtained by reading an original image by a color scanner, and an image designated by the mark is automatically laid out.

Such an image layout operation is popularly applied to image coloring layout operations. In the coloring layout operation, a color mark enclosing a given area is written on an original, and an image inside the color mark area is colored. For example, Published Unexamined Japanese Patent Application No. 57-185767 describes its example. An area designation method using a color mark has the following advantages. That is, an area in a desired pattern can be easily designated as compared to area designation using a tabulator, a coordinate input device, or the like, cumbersome operations for, e.g., replacing originals, measuring the position of an area on an original, and the like need not be performed, and so on.

In order to perform such an image layout operation, a mark image signal corresponding to, e.g., a color frame mark for designating a layout range and a to-be-laid-out image signal corresponding to, e.g., a monochromatic image portion to be laid out must be discriminated and separated from an input image signal obtained by reading an original. In this case, the mark image signal need not have a high resolution since it is data indicating a boundary of an area to be colored, and it is rather important that the mark image signal allows rough recognition of connection, and is not easily influenced by noise. On the other hand, it is important that the to-be-laid-out image signal keeps a high resolution since its image pattern is directly reflected in an output image.

In order to perform separation and discrimination of the mark image signal and the to-be-laid-out image signal, the following method is conventionally adopted. That is, a signal corresponding to a hue, a saturation, and a color difference, or the like is calculated from RGB image signals obtained by reading an image on an original to descriminate a color. If a chromatic color such as red, green, blue, or the like is detected, a color frame mark (mark image signal) is discriminated, and if an achromatic color such as black, gray, or the like is detected, a monochromatic image portion (to-be-laid-out image signal) is discriminated. As detailed methods of determining the mark image signal and the to-be-laid-out image signal, for example, a method of comparing a color difference signal with a given threshold value, and determining signals based on the relationship between the two signals, a method of directly looking up a look-up table on the basis of RGB image signals, and the like are known.

With these methods, however, it is difficult to perform image processing such as high frequency emphasis filtering of the to-be-laid-out image signal to obtain a high quality image since the to-be-laid-out image signal is converted into a binary signal indicating the presence/absence of a monochromatic image portion.

Meanwhile, in order to process a color image signal, a method of separating a color image signal into two signals, i.e., a hue signal and a density signal, and processing these signals is known (Published Unexamined Japanese Patent Application No. 63-10882). When this method is applied to image layout, the hue signal, for example, can be used as a mark image signal. However, the density signal is a signal representing a density of a hue represented by the hue signal, but does not represent a to-be-laid-out image signal itself. Therefore, this known technique cannot be applied to separatio and discrimination of a mark image signal and a to-be-laid-out image signal in an image layout apparatus.

As described above, according to the prior art techniques, when a mark image signal and a to-be-laid-out image signal are to be separated and discriminated, a color is discriminated from RGB image signals obtained by reading an original image by a color image sensor. If the discriminated color is a chromatic color, a color frame mark (mark image portion) is determined, and if the discriminated color is an achromatic color, a monochromatic image portion (to-be-laid-out image portion) is determined. Thus, the to-be-laid-out image signal becomes a binary signal indicating the presence/absence of a monochromatic image portion, and it is difficult to perform image processing such as high frequency emphasis filtering for obtaining a high quality image.

SUMMARY OF THE INVENTION

It is an object of the present invention to provide an image layout apparatus which can separate and discriminate a mark image signal and a to-be-laid-out image signal without converting the to-be-laid-out image signal into a binary signal.

According to the present invention, since a marked image to be laid out is laid out on an original before image data is input to an electronic printer, an image layout apparatus which can detect a to-be-laid-out image signal independently of detection of a mark image signal can be provided.

According to the present invention, for example, a mark image signal is detected as a code signal representing a color, and a to-be-laid-out image signal is detected as a multi-value signal representing a monochromatic density or chromaticity of a to-be-laid-out image portion on an original.

As described above, since a mark image signal such as a color frame mark and a to-be-laid-out image signal such as a monochromatic image portion are independently detected, a color frame mark can be obtained as a code signal representing the presence/absence of the corresponding color, and a to-be-laid-out image portion can be obtained as a multi-value signal representing a monochromatic density or chromaticity.

Thus, the mark image signal and the to-be-laid-out image signal can be independently subjected to processing. For example, the mark image signal such as a color frame mark can be subjected to noise reduction, e.g., isolation point removal since it is expressed by a binary signal for each color, and the to-be-laid-out image signal can be subjected to image quality improving processing (especially, sharpness improving processing) by, e.g., a high frequency emphasis filter. When the to-be-laid-out image signal is subjected to, e.g., high frequency emphasis filtering, blurring caused in a reading system can be corrected, and defaced small characters and faint thin lines can be prevented, thus improving image quality.

Furthermore, according to the present invention, an image layout apparatus which requires no prescanning operation using a special light source, and can perform correct area designation even for a color original or an original using color paper.

This image layout apparatus utilizes a unique nature of a fluorescent color, i.e., a nature in that the fluorescent color has a high hue and a high saturation, and considerably deviates from a range which can be reproduced by, e.g., Y (yellow), M (magenta), and C (cyan) process inks used in a conventional printer. Thus, a degree of deviation from the range is detected by a fluorescent color detector, thus discriminating an area designated by a fluorescent color marker. This detection can be performed based on a negative value of a color conversion output signal by, e.g., masking processing.

More specifically, according to this image layout apparatus, since area designation can be performed by a fluorescent color marker, area designation can be performed for a color original including chromatic colors as well as a black-and-white original whose background is contaminated. Thus, proper area discrimination can be performed.

The image layout apparatus is based on detection of the unique nature of the fluorescent color. This nature appears regardless of types of light source for illuminating the fluorescent color. Therefore, a light source can be those used in a conventional color scanner, such as a fluorescent lamp, a halogen lamp, or the like, and no special light source for exciting a fluorescent color is required. For this reason, no prescanning operation using a special light source is required, and an arrangement of the apparatus can be simplified. In addition, control can be facilitated.

Furthermore, an image to be subjected to color image processing is color-converted independently of fluorescent color detection. That is, the color image processing is performed for only a discriminated signal in a discriminated area. For this reason, even when a color image in a normal color approximate to a fluorescent color is to be processed, noise processing is performed in, e.g., an area discrimination circuit, and a noise component can be removed from an area discrimination signal. As a result, color image layout processing which can minimize noise components can be satisfactorily performed.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2C are views for explaining an image layout operation by coloring executed by the image layout apparatus of the present invention;

FIG. 3 is a chart showing contours of to-be-laid-out image signals on an Lab space;

FIGS. 4A and 4B are views showing image layout results at an intersection between a black line and a color frame mark;

FIG. 5 is a block diagram of an image quality improving circuit;

FIG. 12 is a table showing the relationship between input signals and output signals in an image layout section in the embodiment shown in FIG. 9;

FIG. 13 is a table showing the relationship between input signals and output signals in an image layout section in the embodiment shown in FIG. 9;

FIG. 15 is a graph showing absorption and emission spectra of a fluorescent color;

FIG. 16 a graph for comparing spectral distributions of a fluorescent color and a normal color;

FIG. 23 is a block diagram of a color processing circuit;

FIG. 25 is a block diagram of a main part of a color image layout apparatus according to still another embodiment of the present invention.

DETAILED DESCRIPTION OF THE PREFERRED EMBODIMENTS

A color image copying machine to which the present invention is applied will be described below with reference to FIG. 1.

The copying machine has a monochromatic image coloring function according to the present invention as well as a full-color image copying function. These functions can be selected by an instruction from a console panel.

In a coloring processing, a mark image corresponding to an area colored by a color frame mark (color frame line) is read out, the read image is processed according to a predetermined instruction, and the processed image is printed out by a color printer. In this embodiment, a black or gray portion, i.e., a monochromatic image portion of an original image is used as a to-be-laid-out image, and a chromatic frame line is used as a mark image, thereby designating processing of the to-be-laid-out image.

FIGS. 2A and 2B show an example of coloring lay out in detail. In this example, a color frame mark is written on a monochromatic original image shown in FIG. 2A, as indicated by hatching in FIG. 2B, and the image shown in FIG. 2B is laid out, as shown in FIG. 2C.

Figure 1:
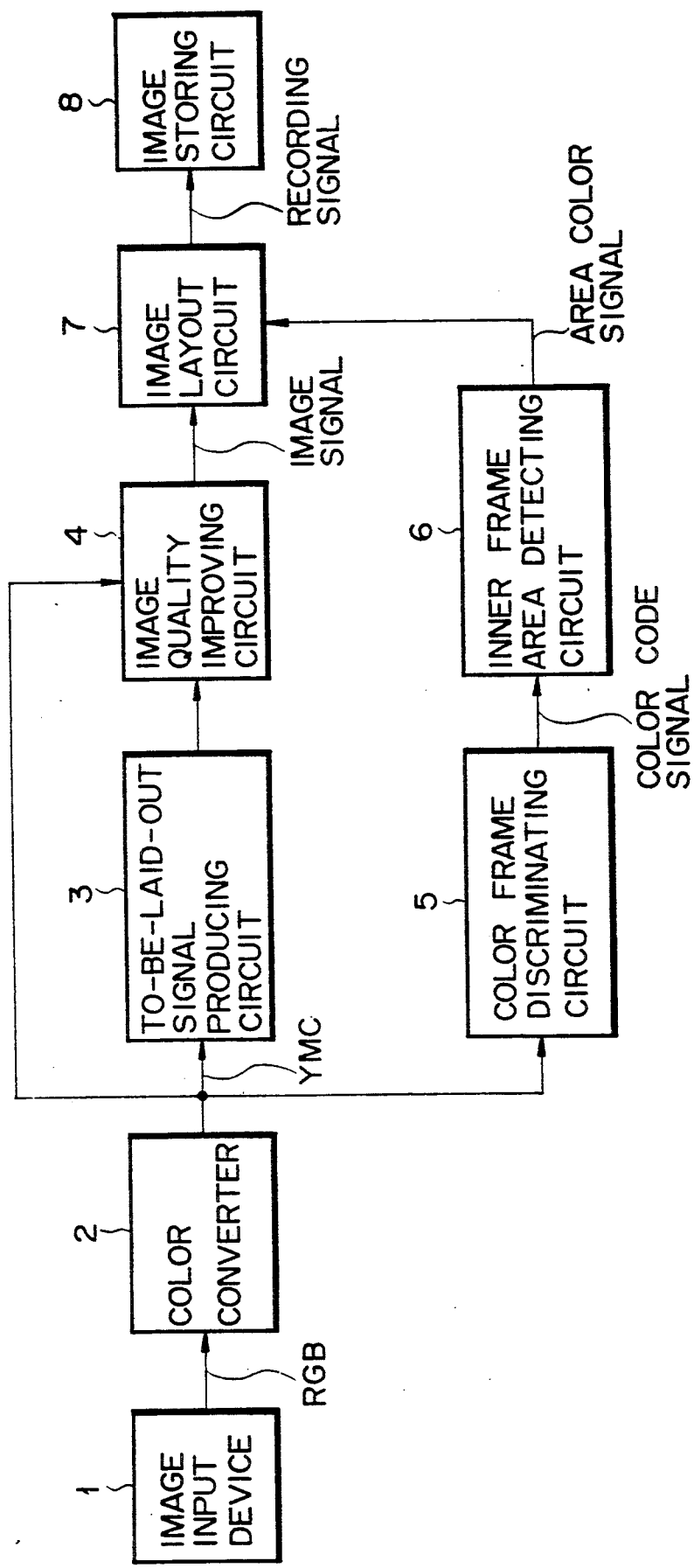
FIG. 1 is a block diagram of a color image copying machine comprising an image layout apparatus according to an embodiment of the present invention.

According to the color image copying machine shown in FIG. 1, an image input device 1 comprising, e.g., a color scanner is connected to a color converter 2. An output from the color converter is coupled to a to-be-laid-out signal producing circuit 3, an image quality improving circuit 4, and a color frame discriminating circuit 5. The output from the to-be-laid-out image producing circuit 3 is connected to the image quality improving circuit 4. The output from the color frame discriminating circuit 5 is connected to an image processing circuit 7 through an inner frame area detecting circuit 6 together with the output from the image quality improving circuit 4. The output from the image processing circuit 7 is connected to an image storing circuit 8.

In the copying machine described above, a color image on an original is read by the image input device 1 as three color image signals, i.e., red (R), green (G), and blue (B) image signals (to be referred to as RGB signals hereinafter). The RGB signals are then converted by the image converter 2 into ink amount signals expressed by three color ink densities, i.e., yellow (Y), magenta (M), and cyan (C) ink densities to be recorded by the image storing circuit 8. Thereafter, the to-be-laid-out signal producing circuit 3 produces to-be-laid-out image signals based on the ink amount signals. The to-be-laid-out signals or the ink amount signals are subjected to image quality improving processing (mainly, high frequency correction (emphasis) processing) by the image quality improving circuit 4.

Meanwhile, the color frame discriminating circuit 5 extracts color frame data as a mark image signal from the ink amount signals. According to this extracted color frame data, the inner frame area detecting circuit 6 detects an inner area of each color frame. The ink amount signals subjected to the image quality improving processing and output from the image quality improving circuit 4 are colored by the image processing circuit 7 using area color signals output from the inner frame area detecting circuit 6. Thereafter, the image storing circuit 8 records an image using four color inks, i.e., Y, M, C, and K (black) inks.

In this embodiment, the image storing circuit 8 comprises a color printer adopting a frame sequential system. In the frame sequential system, one page is printed in the first color ink, the identical page is printed in the second color ink, and the identical page is then printed sequentially in the third and fourth color inks. For this reason, the image input device 1 reads an image four times in order to copy one image, and the following image process units (the color converter 2, the to-be-laid-out signal producing circuit 3, the image quality improving circuit 4, the color frame discriminating circuit 5, the inner frame area detecting circuit 6, and the image processing circuit 7) also repeat processing four times.

The arrangements and operations of the respective circuits shown in FIG. 1 will be described in detail below.

Image Input Device 1

An image on an original is read by the image input device 1, and digital RGB image signals are generated. More specifically, a pixel sequential color line sensor in which RGB color filters are arranged in turn on a light-receiving surface scans an original in a direction perpendicular to the longitudinal direction of the sensor while reading image data line by line, thereby reading an original image as raster scan signals. A line direction will be called as a main scanning direction, and a direction perpendicular thereto will be called a subscanning direction. Analog signals photoelectrically converted by the line sensor are converted into digital signals by an A/D converter, and the digital signals are subjected to shading correction. This correction is performed to correct a variation in gain or offset of the elements of the line sensor, and white balance of RGB image signals. That is, black and white pixels on an original are normalized so that corresponding image signals become 0 and 1. The detailed arrangement and functions of this portion are described in detail in, e.g., Published Unexamined Japanese Patent Application No. 61-71764.

The shading-corrected RGB signals are then subjected to pixel sequential correction. In the pixel sequential color sensor, since color data of three points which are offset by ⅓ a pixel are color-separated, color noise is generated at an edge portion on an image. When interpolation processing according to a point offset is performed by pixel sequential correction, this noise can be removed. The pixel sequential correction is described in detail in, e.g., Published Unexamined Japanese Patent Application No. 61-154357.

Color Converter 2

The color converter 2 converts RGB image signals into YMC ink amount signals, and a black ink amount signal. The YMC ink amount signals are signals representing the densities of three primary color inks, i.e., Y, M, and C inks necessary for expressing colors represented by RGB image signals.

In this embodiment, the RGB image signals are converted into the YMC ink amount signals by a masking method. In a full-color copying mode, ink recording densities are determined by the YMC ink amount signals, thereby realizing high color reproducibility. Colors on a normal reflective original are locally present in a color space defined by RGB image signals. However, when the RGB image signals are converted into YMC ink amount signals, colors can be present in almost the entire area of an ink amount signal space. Therefore, redundancy of signals can be reduced by converting the RGB image signals into the YMC ink amount signals. As will be described later, to-be-laid-out image signals can be easily calculated from the YMC ink amount signals.

An ink amount signal of an ink having a high hue or a fluorescent color has a negative value as a result of calculations. Therefore, if a range of an ink amount signal is extended to a negative value, special colors such as colors having a high hue, fluorescent colors, and the like can be easily discriminated from normal colors by converting RGB image signals into YMC ink amount signals.

To-be-processed Signal Producing Circuit 3

The to-be-laid-out signal producing circuit 3 produces to-be-laid-out signals on the basis of the YMC ink amount signals. As described above, the to-be-laid-out signals are image signals corresponding to a monochromatic image portion to be subjected to coloring processing by the image processing circuit 7 in accordance with a designation of a mark image such as color frame data. Thus, it is preferable that a to-be-laid-out image portion as a monochromatic image portion (image expressed by black or gray) is separated and discriminated from a white background and a color frame mark, and is detected as multi-value signals to increase a degree of freedom of image improving processing. Therefore, a to-be-laid-out image signal may have a value according to the density in a black/gray portion, and may be 0 in a white background portion or a color frame portion.

In this embodiment, a to-be-laid-out image signal X is calculated according to the following equation (1):

$$X = X^{ny} \cdot M^{nm} \cdot C^{nc} \tag{1}$$

where coefficients ny, nm, and nc are constants falling within a range of 0.1 to 2.0. In this embodiment, the coefficient nm for magenta (M) is selected to be relatively larger than those of the remaining colors because man's visual sensitivity is high for green, the density of a green color marker is relatively high, and the like. More specifically, the coefficients are set to be ny=0.8, nm=1.4, and nc=0.8.

When an original has a chromatic color, at least one of the YMC ink amount signals has a considerably small value. For example, YMC signals of a green portion are Y=1, M=0, and C=1. Therefore, in this portion, a to-be-laid-out image signal X becomes 0 or a value sufficiently close to 0. On the other hand, when an original has an achromatic color (e.g., black or gray), all the YMC signals become 1 or values having certain magnitudes. Therefore, a to-be-laid-out image signal X has a value larger than 0 to some extent. More specifically, to-be-laid-out image signals produced by using equation (1) can have values according to the densities of black and gray portions, and can have a sufficiently small value for chromatic and white background portions, thus satisfying the above-mentioned conditions. FIG. 3 illustrates contours of the to-be-laid-out image signals on an Lab space.

Even when a color frame line overlaps a black portion of an original or crosses a black line, as shown in FIG. 4A, it is preferable that only the black portion is detected as a to-be-laid-out portion. According to the method of this embodiment, in this case, a to-be-laid-out image signal according to an original black density can be obtained in a portion 41 where a color frame mark overlaps the black portion, and a to-be-laid-out image signal has a value almost equal to 0 in a portion 42 of only a frame line. Thus, a to-be-laid-out image signal substantially corresponding to the density of an original black portion of an original image can be obtained. A portion where a to-be-laid-out image signal has a value exceeding a given threshold value in an image shown in FIG. 4A is indicated by vertical hatching in FIG. 4B. Thus, as will be described later, the image quality improving circuit 4 can execute high frequency emphasis filtering of the to-be-laid-out image signal, thereby more sharply reproducing an original black portion.

In this embodiment, this to-be-laid-out image signal is utilized for a black-plate ink amount signal in the full-color copying mode. As is well known, when a normal full-color image is recorded, a sufficient black density cannot be obtained by only YMC inks, and a printing operation is preferably performed by recording a black ink on a black portion, thus emphasizing the black portion. On the other hand, when a black ink signal is printed on a chromatic color portion, colors are rendered opaque to considerably degrade image quality. Thus, the black ink signal is printed on a chromatic color portion as little as possible. Such conditions are similar to the nature of the to-be-laid-out image signal, and it is advantageous that this to-be-laid-out image signal is directly used as a black ink amount signal. Since the black ink amount signal and the to-be-laid-out image signal are commonly used in the full-color copying mode and the monochromatic image coloring processing mode, the overall circuit scale can be reduced as compared to a case wherein these signals are not commonly used.

In this embodiment, the coefficients ny, nm, and nc as processing parameters have common values in the full-color copying mode and the monochromatic image coloring processing mode. Alternatively, these coefficients may have proper values according to respective processing modes in place of the common values in the two modes.

In this embodiment, the to-be-laid-out image signal is produced according to equation (1). For example, a to-be-laid-out image signal may be produced by the following equation (2) or (3):

$$X = f(Y) \cdot f(M) \cdot f(C) \tag{2}$$

$$X = min(Y, M, C) \tag{3}$$

where f is an arbitrary function satisfying conditions f(0)=0 and f(1)=1, and min is a function representing a minimum value.

Signals obtained by these equations (2) and (3) become 1 when an original is black, i.e., when Y=M=C=1, and become 0 when an original has a chromatic color. Thus, these signals can satisfy conditions of the to-be-laid-out image signal.

As another modification, a method using an output signal from the color frame discriminating circuit 5 may be employed. As will be described later, the color frame discriminating circuit 5 looks up a look-up table (LUT) on the basis of YMC ink amount signals, thereby discriminating an image in five ways, i.e., red, green, blue, yellow, and an achromatic color. A discrimination result is represented by Q, and a to-be-laid-out image signal X is calculated based on Q according to the following equation (4):

$$X = a_y \cdot Y + a_m \cdot M + a_c \cdot C \quad (Q \text{ is achromatic color})$$

$$X = 0 \quad (Q \text{ is other than achromatic color}) \qquad (4)$$

where ay, am, and ac are the weighting coefficients, a sum of which becomes 1. Since visual sensitivity of green is high, values (ay, an, ac = (0.2, 0.5, 0.3) are used in this embodiment. The to-be-laid-out image signal satisfying the above-mentioned conditions can be obtained.

In all the above modifications, the to-be-laid-out image signal is calculated after the RGB image signals are converted into the YMC ink amount signals since the chromatic colors can be easily discriminated when the YMC ink amount signals are used, as described above. However, the present invention is not limited to this method. For example, the to-be-laid-out image signal may be directly calculated from the RGB image signals.

Image Quality Improving Circuit 4

The image quality improving circuit 4 executes high frequency emphasis filtering of a to-be-laid-out image signal to correct blurring caused by, e.g., the image input device 1 (image reader). Thus, defaced small characters and faint thin lines can be prevented, and a sharp image can be prevented. In the full-color copying mode, such processing is executed for ink amount signals.

FIG. 5 shows a detailed arrangement of the image quality improving circuit 4. A selector 51 selects one of the YMC ink amount signal from the color converter 2 and the to-be-laid-out image signal from the to-be-laid-out signal producing circuit 3. In the full-color copying mode, an ink amount of a color plate to be printed is selected, and in the coloring processing mode, the to-be-laid-out image signa is selected.

Figures 6, 7:
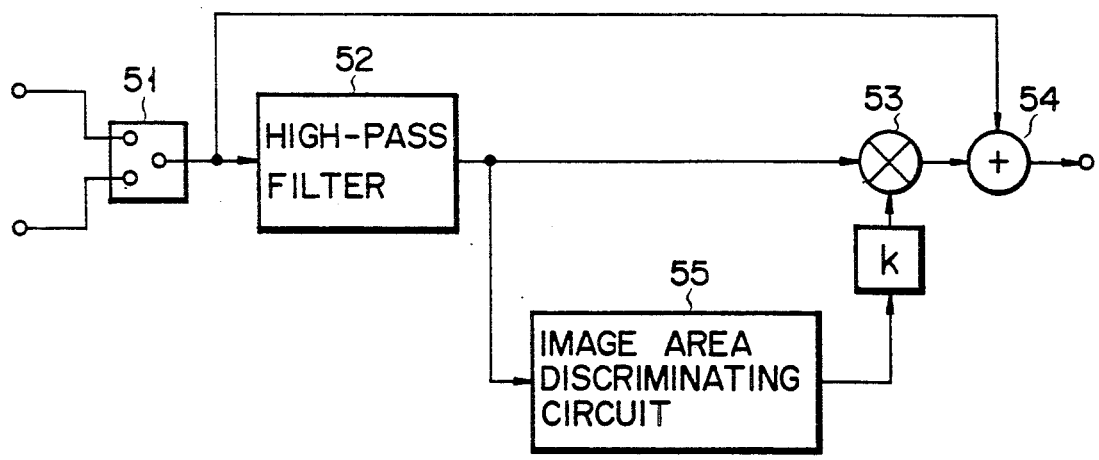
FIG. 6 is a table showing a kernel of a high-pass filter.
FIG. 7 is a block diagram of an image quality improving circuit according to modification.

The image signal selected by the selector 51 is input to a high-pass filter 52. The high-pass filter 52 removes high-frequency components, in particular, DC components of the signal. FIG. 6 shows an example of a kernel of this filter. An output signal from the high-pass filter 52 is multiplied with a constant k by a multiplier 53, and the product is added by an adder 54 to the signal selected by the selector 51, thus obtaining a high-frequency corrected signal. The constant k is a coefficient for determining a degree of high-frequency emphasis, and as the value of the coefficient k becomes larger, the degree of high-frequency emphasis is increased. The constant k is determined according to MTF characteristics in an image reading system or the image recording circuit. Blurring caused by, e.g., the reading system is corrected by the high frequency emphasis filtering, and small characters and the like can be sharply reproduced without being defaced. In the coloring processing, such processing is particularly effective since there are many originals including characters and lines which require high resolution.

In the above description, the image signal is unconditionally subjected to high frequency emphasis filtering. For this reason, if an original image includes a dot portion, a dot component is emphasized, and image quality becomes rather noisy. In addition, when a recording circuit employs a dither method, interference occurs between a dot portion and a period of dither patterns, thus generating moire noise. In order to prevent this, an original image is subjected to image area discrimination, i.e., whether an original image is a dot image or a character image is discriminated, and the constant k can be switched according to the discrimination result. FIG. 7 shows an arrangement of the image quality improving circuit 4 using this method. This arrangement is substantially the same as that of the image quality improving circuit 4 shown in FIG. 4, except that an output from the high-pass filter 52 is also input to an image area discriminating circuit 55, and the constant k is switched according to the image area discrimination result. Note that the detailed method and principle of image area discrimination are described in detail in Published Unexamined Patent Application No. 60-204177.

Then, a series of processing operations for detecting color frame data as a mark image signal, and detecting an inner frame area based on the detected color frame data will be described below. These processing operations are executed by the color frame discriminating circuit 5 and the inner frame area detecting circuit 6. Note that these processing operations are enabled in only the coloring processing mode, and ar disabled in the full-color copying mode.

Color Frame Discriminating Circuit 5

Figures 8A, 8B:
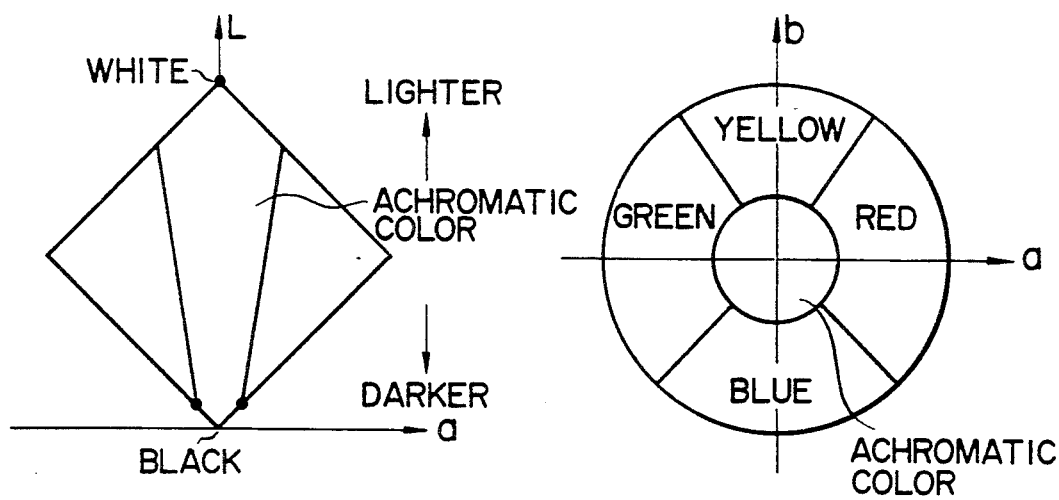
FIGS. 8A and 8B are views for explaining color discrimination on the Lab space in the embodiment shown in FIG. 7.

The color frame discriminating circuit 5 detects a color frame mark on an original. In this embodiment, the color frame mark is discriminated by looking up a look-up table (LUT). As is well known, when colors are expressed in the Lab space, achromatic colors such as white, black, and the like are expressed as dots on an achromatic color axis given by $a = b = 0$, and chromatic colors such as red, blue, and the like used as color frames are expressed as dots separated from the achromatic color axis. Therefore, when the Lab space is divided, as shown in FIGS. 8A and 8B, colors can be discriminated. In this embodiment, five types of colors, i.e., red, green, yellow, blue, and other achromatic colors are discriminated, as shown in FIGS. 8A and 8B. The color frame discriminating circuit outputs a corresponding color code signal in accordance with whether a pixel of interest has an achromatic color, red, green, blue, or yellow. As color codes, codes 0, 1, 2, 3, and 4 are assigned to the achromatic color, red, green, blue, and yellow, respectively.

The LUT used for the color frame discriminating circuit 5 can be constituted by converting divided planes on the Lab space onto a YMC space. As described above, since the YMC ink amount signals have a wide color space and high quantization efficiency, color frames can be precisely discriminated by the LUT having a small table capacity (in this embodiment, a 5-bit address for each of Y, M, and C signals, i.e., a total of 15-bit addresses).

When a frame line overlaps or crosses an original black portion (FIG. 4B), a portion overlapping the black portion is preferably determined as a frame line. In particular, when a frame line is disconnected by an intersection with a black line, an inner frame area cannot often be correctly detected. Thus, the color frame discriminating circuit 5 sets a determination threshold value between a chromatic color (color frame) and an achromatic color (other than the color frame) at a high density to be a value having a relatively low saturation. In this manner, an area having a high density is determined as a chromatic color even if it has a low saturation. In a portion where a frame line crosses a relatively fine black line, the crossing portion can have a proper saturation due to a blurred or overlapping color frame or blurring in an image reading system. Therefore, a portion where a color frame crosses a fine black line (hatched portion in FIG. 4B) can also be determined as a frame line. Thus, a frame line is not disconnected even if it crosses a black line, and an inner frame area can be correctly detected.

The color frame discriminating circuit 5 has nothing to do with a detection result of a to-be-laid-out image signal since it operates of the to-be-laid-out signal producing circuit 3. For this reason, a portion where a to-be-laid-out image signal has a large value (black portion), and corresponding to a color frame mark (a portion indicated by cross-hatching in FIG. 4B) can be discriminated, and two types of line data can be correctly detected even when a color frame crosses a black line. In addition, detecting operations of a color frame and a black portion can be independently optimized according to their natures. resulting in easy adjustment.

A signal discriminated by the color frame discriminating circuit 5 includes many discrimination errors caused by the influences of fainting or blurring caused when a color frame is written or noise components added upon reading of an image. When a color frame on an original suffers from color nonuniformity or noise. components, a frame may be formed on a portion other than a frame line or a hole may be formed in the frame line. These noise components can be distinguished from an original frame mark or background since they have a small area. In this embodiment, after color frame discrimination, processing, e.g., isolated point removal, is performed, thereby suppressing these noise components. Alternatively, smoothing processing may be executed. In addition, logic sum processing may be performed to simultaneously suppress noise components and reduce data. In this case, an arrangement of a temporary storage memory in the next inner frame area detecting circuit 6 can be simplified.

Inner Frame Area Detecting Circuit 6

Figure 9:
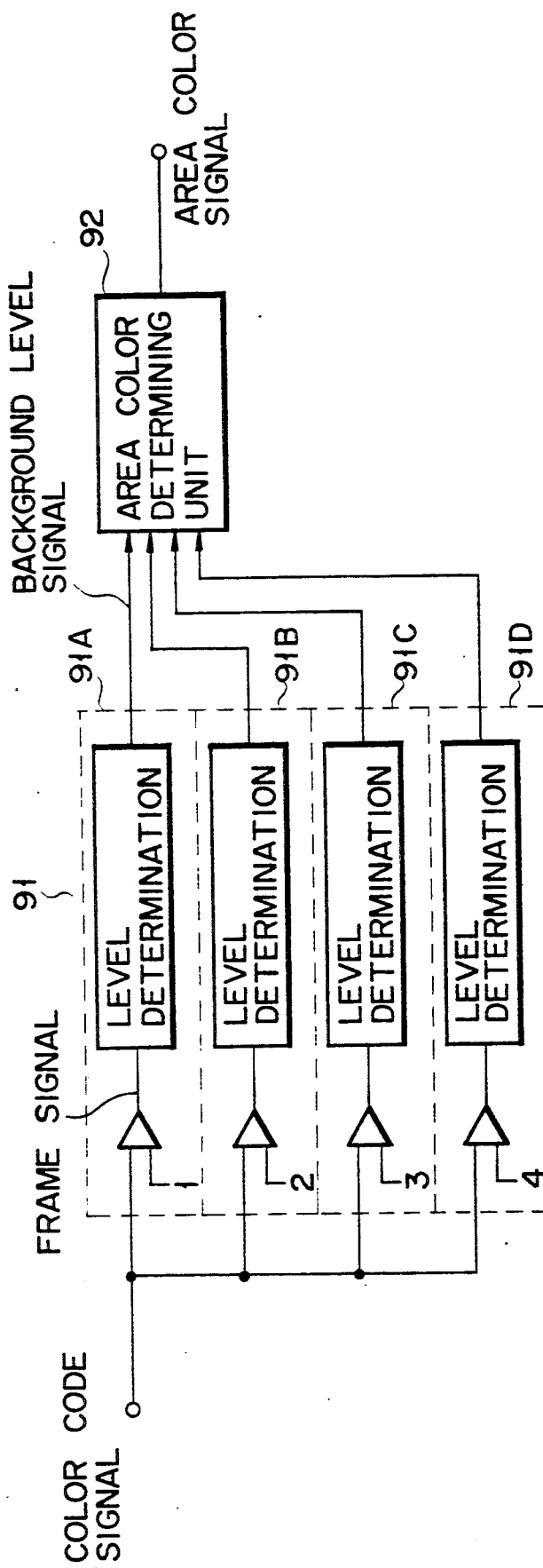
FIG. 9 is a block diagram showing an inner frame area detecting circuit.

The inner frame area detecting circuit 6 receives the color code signal from the color frame discriminating circuit 5, and detects an area (inner frame area) enclosed by the color frame discriminated by the color frame discriminating circuit 5. FIG. 9 shows a detailed arrangement of the inner frame area detecting circuit 6. As shown in FIG. 9, the circuit 6 mainly comprises an inner frame discriminating unit 91 for independently detecting inner and outer portions of color frames of four colors, e.g., red, green, yellow, and blue, and an area color determining unit 92 for determining area colors in units of areas on the basis of the inner frame discrimination results of four colors.

The inner frame discriminating unit 91 determines color frame marks of four colors as frame portions, and portions of other colors (including achromatic colors) as background portions. For example, a red frame discriminating section 91A compares the input color code signal with a red color code signal (1), and produces a frame signal indicating a frame (1) if a coincidence is found between two signals; otherwise, outputs a frame signal indicating a background (0). The discriminating unit then defines frame and background levels having values of integers equal to or larger than 0 in coupled portions of frames and backgrounds. In this case, an outermost background level is set to be 0, and frame and background levels of a present raster are sequentially determined on the basis of the frame and background levels of the previous raster and the coupling relationship between frames and backgrounds of the previous and present rasters. Thus, a background level means a signal representing a background portion position as the number of nests from the outermost background portion, and a frame level serves as an auxiliary value for determining the background levels beyond frames. Whether the background level is an even or odd number means an inner or outer frame, and this background level signal is output as an inner frame discrimination result. This processing is similarly performed independently for the color frames of three colors other than the red frame. The method and principle of such inner frame discrimination are described in detail in Japanese Patent Application Nos. 1-150545 and 1-150546 previously filed by the present applicant.

Figure 10A:
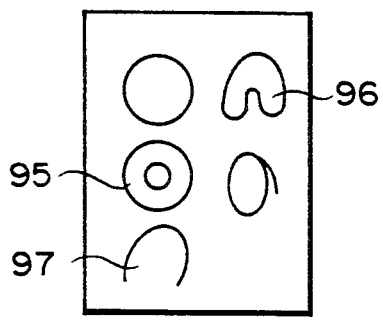
FIGS. 10A and 10B are views showing examples detected by the inner frame area detection unit shown in FIG. 9.
Figure 10B:
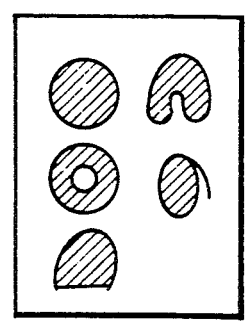

Fig. lOB shows results of the inner frame area detection processing of frame line patterns shown in FIG. 10A. According to the method of this embodiment, inner areas defined by double frames 95 and a recessed frame line 96 shown in FIG. 10A can be correctly detected. Even if a hair pattern is formed due to handwriting, no detection error occurs, thus allowing highly reliable inner frame area detection. Since inner frame detection is performed for a raster-scan image signal in real time processing, a frame 97 whose lower portion in the sub-scanning direction is not closed is also detected as a closed frame line. However, this does not pose a serial problem in practical use.

Figure 11:
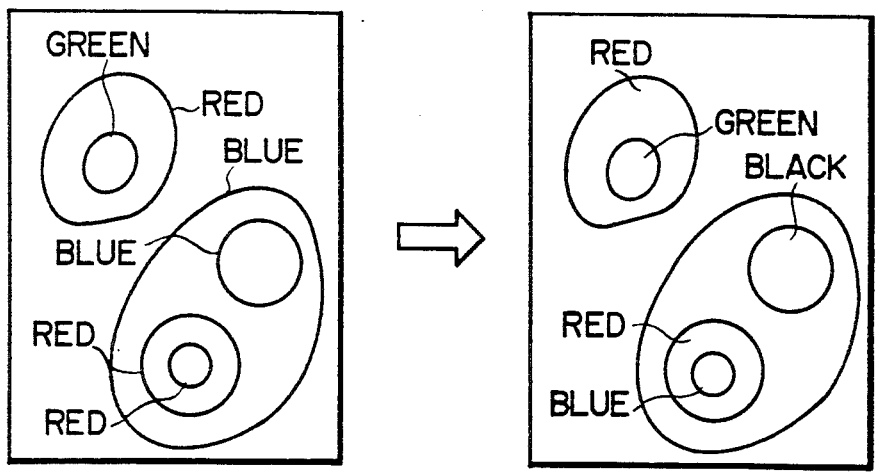
FIG. 11 is a view for explaining areas designated by multi-color and multi-frames in the inner frame area detecting circuit shown in FIG. 9.

In FIG. 9, after inner frame areas are detected in units of color frames by the inner frame discriminating unit 91, area colors of the inner frame areas are determined by the area color determining unit 92. Note that an area color represents a color in which a to-be-laid-out image in the corresponding inner frame area is to be colored. In this apparatus, when different multiple frames are formed, as shown in FIG. 11, if an area color outside a given color frame is the same as a color of the given color frame, a still outer area color is determined as an inner area color of the given color frame. In this case, if the area color outside the given color frame is different from the color of the given color frame, the color of the given color frame is determined as the area color inside the given color frame. With these specifications, an operator sequentially writes color frames from the outside, thereby hierarchically designating area colors. Thus, easy area designation can be attained.

More specifically, the area color determining unit 92 employs stack memories to store area colors outside the respective frame lines, and pushes or pops the stack memories according to whether or not a color of a frame line is equal to an area color, thereby determining an area color signal satisfying the above-mentioned specifications. The method and principle of the area color determination are also described in detail in Japanese Patent Application Nos. 1-150545 and 1-150546 mentioned above.

Image Processing Circuit 7

The image signal subjected to image quality improving processing by the image quality improving circuit 4 and the area color signal determined by the inner frame area detecting circuit 6 are input to the image processing circuit 7. In the full-color copying mode, the image processing circuit 7 directly outputs the image signal as a recording signal. In the coloring processing mode, the image processing circuit 7 executes coloring layout of the to-be-laid-out image signal, and outputs the processed signal as a recording signal.

In the coloring layout mode, the image signal out-put from the image quality improving circuit 4 means a to-be-laid-out image signal. If the image signal from the circuit 4 is an ink image for recording a color indicated by the area color signal from the inner frame area detecting circuit 6, the to-be-laid-out image signal x is directly used as an output image signal; otherwise, the output image signal is set to be 0, thereby realizing coloring layout. If an area color is red (refer to FIG. 12), since inks necessary for recording red are Y and M, the to-be-laid-out image signal x is directly output for yellow and magenta, and 0 is output for cyan and black plates regardless of the magnitude of the input to-be-laid-out image signal. In other words, no output signal is generated as shown by "—" in FIG. 12. FIG. 12 shows the detailed relationship of input and output signals. This can be easily realized by a simple combination logic or a small-capacity table, and a selector.

In this embodiment, a portion having an area color of black, i.e., a portion which is not surrounded by a frame is recorded in one color of a black ink. However, the present invention is not limited to this. For example, such portion may be expressed by overlapping four colors, i.e., Y, M, C, and K inks using the relationship shown in FIG. 13.

In this embodiment, density data of an input monochromatic signal is preserved. However, if an image to be recorded does not require density data, a to-be-laid-out image signal may be binarized, and then subjected to coloring layout. That is, the image signal x shown in FIGS. 12 and 13 is binarized and outputs as 1 or 0.

In this embodiment, as layout processing, coloring layout of a color designated by a color frame is performed. A color frame and a replacing color need not always be the same. For example, masking processing, i.e., processing for erasing an image inside a frame may be executed for a specific color frame. For example, monochromatic portions in areas surrounded by red, green, and blue frame lines may be replaced with red, green, and blue portions, respectively, and a portion inside an area surrounded by a yellow frame line may be subjected to masking. The method of the present invention may be applied to cut-and-paste processing in combination with image shift processing.

Image Storing Circuit 8

Finally, an image is recorded on a paper sheet by the image storing circuit 8 in accordance with a recording signal output from the image processing circuit 7. As described above, this embodiment employs the melting type thermal transfer printer, and the recording densities of four color inks are controlled by, e.g., an area modulation method in accordance with the recording signal from the image processing circuit 7, thereby forming a color image on a recording sheet.

With the series of processing operation described in the above embodiment, an image which faithfully reproduces an original image can be recorded in the full-color copying mode. In a coloring image edit mode, an image obtained by coloring a monochromatic image using color frames can be obtained as a high-quality recording result free from defaced characters or faint thin lines.

In the above embodiment, coloring layout is executed in an area designated by a color frame. However, the present invention is not limited to this. For example, the present invention may be applied to cut-and-paste processing for shifting an image in a frame to another portion as layout processing.

The present invention can be applied to a case wherein a method wherein color marks "[" and "]" are marked on an image to designate a rectangular area having these marks as the upper left and lower right corners is employed as a method of designating an area to be laid out.

In the above embodiment, an image signal of a black portion is used as a to-be-laid out image signal. For example, image signals of black and green portions may be used as to-be-laid out image signals, and image signals of chromatic colors other than green may be used as layout image signals.

According to the above embodiment, a to-be-laid-out image signal such as a monochromatic image signal is detected independently of detection of a layout image signal such as a color frame signal. Thus, processing operations suitable for these signals, i.e., processing such as isolated point removal for improving detection precision for the layout image signal, and image quality improving processing for correcting MTF characteristics in an image reading system for a to-be-laid-out image signal, can be independently executed. Therefore, both detection precision of an inner frame area and image quality can be improved at the same time.

Even when a color frame for designating an area crosses or overlaps a black line, both a layout image signal and a to-be-laid-out image signal can be completely detected.

Furthermore, as a method of detecting a layout image signal, YMC ink amount signals are calculated using RGB image signals, and calculations are made using these signals based on equation (2) described above, so that a to-be-laid-out image signal can be precisely calculated with simple processing, and a circuit for calculating this signal can be commonly used as a circuit for producing a black plate signal in the full-color copying mode, thus reducing the overall circuit scale.

An embodiment wherein no prescanning operation using a special light source is required, and an area can be correctly designated on a color original or an original using color paper will be described below.

Figure 14:
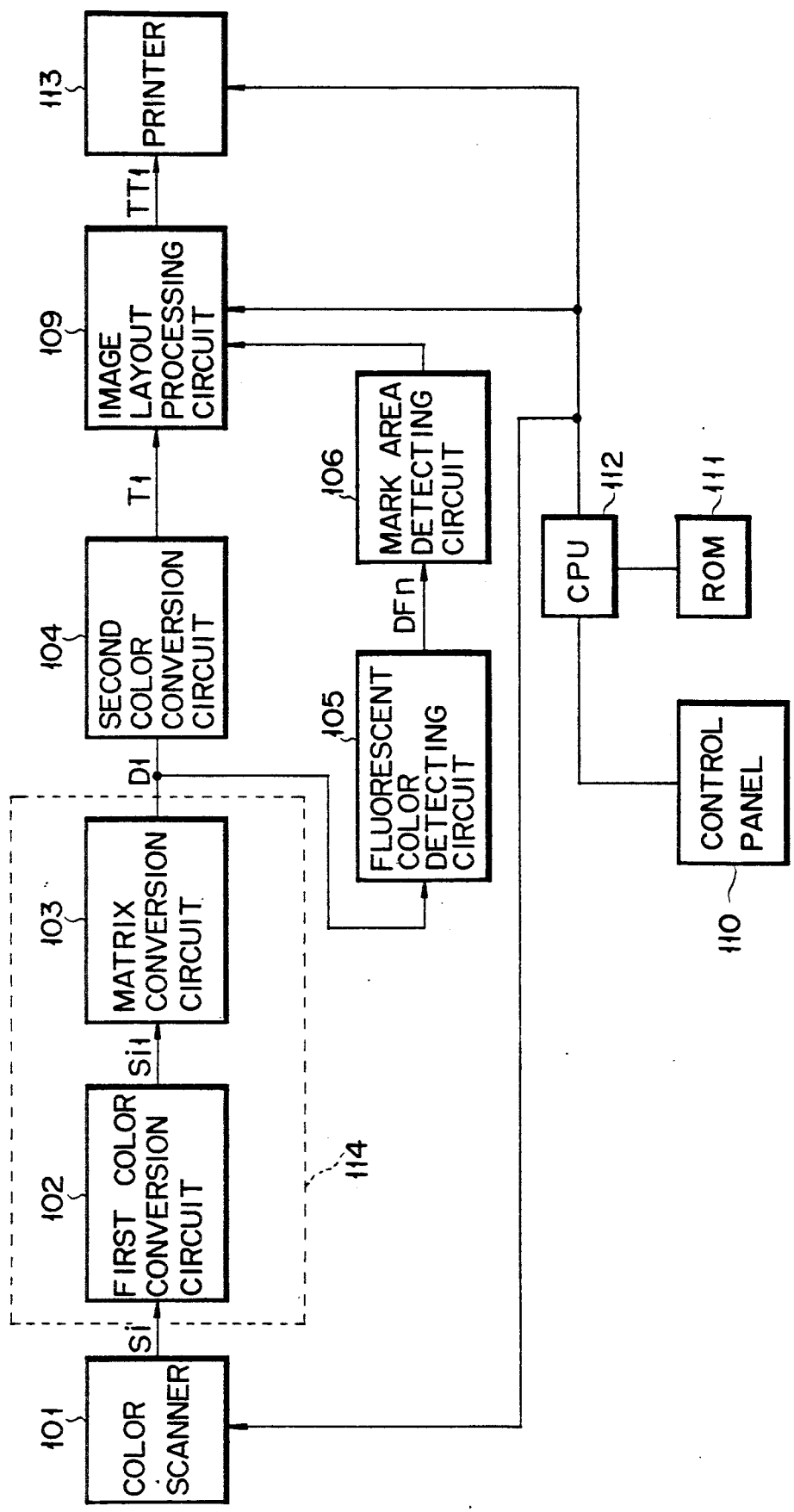
FIG. 14 is a block diagram of a color printer using an image layout apparatus according to another embodiment of the present invention.

According to a color image processing apparatus shown in FIG. 14, a color scanner 101 reads a color original, and outputs color signals Si. An area to be laid out is designated on the color original directly or through a transparent sheet using a fluorescent color marker. Note that i indicates a color of color separation filters used in the scanner 101. For example, i=R (red), G (green), or B (blue). The color signal Si is expressed by a value between 0 and 1 in normal color processing, and is defined as follows. That is, if color signals Si are all "1"s, an input color is white, and if they are all "0"s, an input color is black. This predefined process is executed for each pixel if the scanner 101 comprises, e.g., a CCD sensor. This predefined process is also called shading correction, and is executed with reference to a color level signal obtained by reading a white reference plate, and a black level signal read when a light source is turned off. Thus, illuminance nonuniformity of a light source, sensitivity nonuniformity of a sensor, and the like can be corrected.

However, a variation width of the color signal Si is not limited to a value between 0 and 1, and at least R and G components can take a value between 0 and 1.5. This is to distinguish a fluorescent color having a high luminance from other normal colors. Therefore, a signal of a pixel having a light-emission component is not fixed to white level (overflow processing), but a signal including a light-emission component is directly color-converted. Such processing is effective for detecting a mark when a fluorescent color marker, such as a yellow fluorescent color marker, which cannot be easily distinguished from a normal color since the normal color in the color system is originally light, is used.

The color signal Si obtained by the color scanner 101 is converted into a signal Dj which is predefined in terms of hue by a predefined process circuit 114. The predefined process circuit 114 comprises a first color conversion circuit 102 and a color matrix conversion circuit 103.

More specifically, the color signal Si is input to the first color conversion circuit 102, and is converted into an intermediate signal value Sil based on a conversion formula given by the following question (5):

$$Sil = log10(Si + \rho) \tag{5}$$

where $\rho$ is a constant falling within a range of $0 < \rho < 1$, and a value of about 1/256 is preferable.

The color signal Sil is then input to the color matrix conversion circuit 103, and is converted into an ink color signal Dj. Note that j indicates a color of a process ink used in a printer. For example, j=y (yellow), m (magenta), or c (cyan). In this case, the relationship between Sil and Dj is expressed by:

$$\begin{bmatrix} Dy \\ Dm \\ Dc \end{bmatrix} = M \cdot \begin{bmatrix} S\,R1 \\ S\,G1 \\ S\,B1 \end{bmatrix} \tag{6}$$

where M is the 3×3 masking matrix, and is expressed by equation (7):

$$M = \begin{bmatrix} MyR & MyG & MyB \\ MmR & MmG & MmB \\ McR & McG & McB \end{bmatrix} \tag{7}$$

Therefore, the color signals Dj given by equation (6) are rewritten as:

$$\begin{bmatrix} Dy = MyR \cdot SR1 + MyG \cdot SG1 + MyB \cdot SB1 \\ Dm = MmR \cdot SR1 + MmG \cdot SG1 + MmB \cdot SB1 \\ DC = McR \cdot SR1 + McG \cdot SG1 + McB \cdot SB1 \end{bmatrix} \tag{8}$$

Thus, the color signals Dj can be predefined in terms of hue.

Subsequently, the color signal Dj is input to a second color conversion circuit 104 as an ink amount calculation circuit, and is converted into an ink amount signal Tj by a conversion formula given by equation (9):

$$Tj = (1 - pDj)/(1 - p) \tag{9}$$

The color signal Dj output from the color matrix conversion circuit 103 is also input to a fluoresce color detecting circuit 105. The fluorescent color detecting circuit 105 outputs a signal DFn=1 for a color signal pixel, and outputs DFn=0 for other pixels. Note that n indicates a system of fluorescent colors, and n=Y (yellow) system, M (magenta) YM(red) system, or YC (green) system. This signal DFn is supplied to a mark area detecting circuit 106.

The mark area detecting circuit 106 executes noise reduction processing such as isolated point removal of the detected fluorescent color signal, and then detects a mark area. The circuit 106 then outputs the detection result to an image layout processing circuit 109 as an area discrimination signal.

The image layout processing circuit 109 processes the ink amount signal Tj from the second color conversion circuit 104 using the area discrimination signal.

In this case, a processing content for an area designated by a fluorescent marker is stored in a read-only memory (ROM) 111, and layout processing to be executed can be selected from a control panel 110. More specifically, when a processing content is selected by the control panel 110, a CPU 112 reads out processing content data from the ROM 111 accordingly, processes readout data, and outputs it as a processing selection signal to the image layout processing circuit 109. A portion of the image layout processing circuit 109 comprises a programmable memory (e.g., a RAM), and its content is rewritten according to the selected processing.

An ink amount signal TTj processed by the image layout processing circuit 109 is supplied to an output means such as a color printer 113.

The fluorescent color detecting circuit 105 will be described in detail below.

Figure 17:
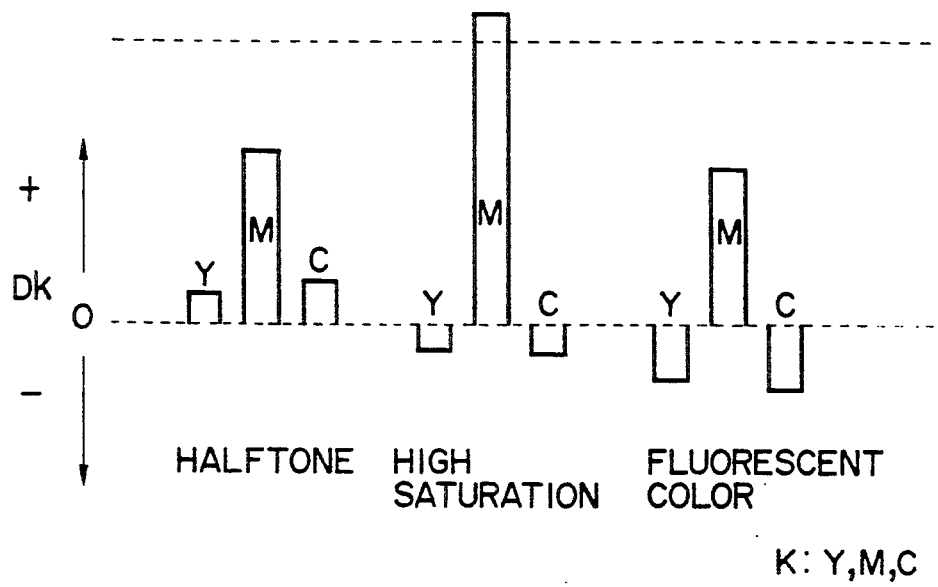
Fig. 17 is a chart for comparing color components of a magenta system normal color, a normal color having a high hue, and a fluorescent color.

FIG. 15 illustrates relative positions of light absorption and radiation bands of a fluorescent color in a wavelength region. As shown in FIG. 15, a fluorescent color absorbs light in a short-wavelength region as excitation light, and radiates energy obtained from the absorbed light as light in a long-wavelength region. As a result, a spectral reflectance obtained when light emitted from a light source such as a white light source which is distributed over a wide visible region is radiated on a fluorescent light is as shown in FIG. 16. Note that FIG. 16 is a graph for comparing spectral distributions of a fluorescent magenta color and a non-fluorescent magenta color. In FIG. 16, a solid curve represents the spectral distribution of the fluorescent light, and a broken curve represents the spectral distribution of the non-fluorescent color. In this manner, the fluorescent color has a very high reflectance (which often exceeds 100%) in a radiation band, and has a low reflectance in an absorption band as compared to other colors. Therefore, the fluorescent color has a very high lightness due to a high peak, and has a high saturation due to a large difference between radiation and absorption bands. In order to reproduce a state of a color having high lightness and saturation using process inks (e.g., Y, M, and C) used in a normal printer, when Y, M, and C ink amounts are obtained by, e.g., a masking method to have a fluorescent magenta color as an input color, results shown in FIG. 17 are obtained. More specifically, for a magenta ink, a positive value is obtained. In this case, the magenta ink amount is suppressed to a small value to reproduce a high lightness. On the other hand, in order to assure a high saturation while suppressing the magenta ink amount to a small value, cyan and yellow ink amounts must be considerably reduced. As a result, the obtained cyan and yellow ink amounts become large negative values. The nature in which a positive ink amount becomes small, and negative ink amounts become large is not limited to a fluorescent magenta color, but applies to all the fluorescent colors. The present invention utilizes this unique nature of the fluorescent color, and employs a function based on a ratio of the magnitudes of positive and negative ink amounts in fluorescent color detection.

Fluorescent colors to be mainly used are roughly classified in units of systems into four systems, i.e., a yellow (Y) system, a magenta (M) system, a red (YM) system, and a green (YC) system. A fluorescent color is discriminated from these systems using a function based on the value of the ink amount signal Dj in units of color systems. If this function is represented by fn, the function fn is given by the following equation based on the color signal Dj:

$$fn = |\Sigma DK/\Sigma Dl| \tag{10}$$

where Dk indicates a negative value of the color signals Dj, and Dl indicates a positive value of the color signals Dj. The fluorescent color detecting circuit 105 calculates the function fn for each of colors belonging to the above-mentioned four systems, and executes threshold value processing of the function fn in units of coefficients. When the function fn is equal to or larger than a threshold value, the circuit 105 outputs a corresponding color as a fluorescent color.

Table 1 below summarizes experimentally determined optimal threshold values h in units of four color systems. Note that the threshold values h are changed depending on inks or an optical system of a scanner used in a printer.

TABLE 1

|  | Threshold Value h |
| --- | --- |
| Yellow | 0.200 |
| Magenta | 0.330 |
| Red | 0.214 |
| Green | 0.198 |

Figure 18:
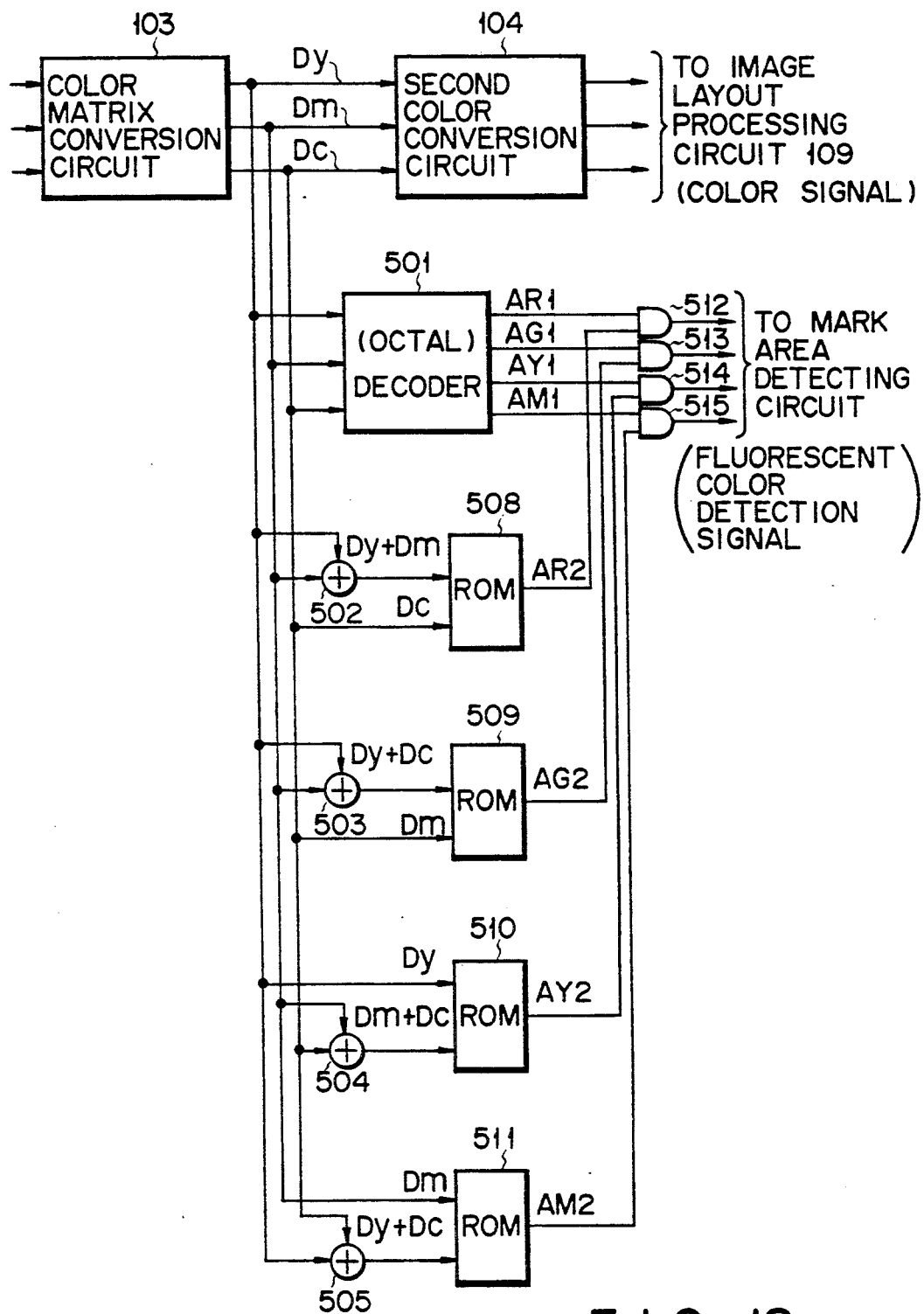
FIG. 18 is a block diagram of a fluorescent color detecting circuit.

FIG. 18 shows a detailed arrangement of the fluorescent color detecting circuit 105. Of the color signal Dj output from the matrix conversion circuit 103, its code bits are input to an (octal) decoder 501. The decoder 501 detects a system to which a color of a corresponding pixel belongs from the above-mentioned four systems on the basis of the code bits. The color signal components Dj are input to four read-only memories (ROMs) 508, 509, 510, and 511 directly or via adders 502, 503, 504, and 505, respectively. The outputs from the decoder 501 and the outputs from the ROMs 508 to 511 are input to four AND gates 512, 513, 514, and 515. Thus, these AND gates 512 to 515 output fluorescent color detection signals.

A detailed processing algorithm of the fluorescent color detecting circuit 105 will be described below with reference to the flow chart of GI. 19. The color signal Dj is input from the matrix conversion circuit 103 to the fluorescent color detecting circuit 105 (601). The value of the fluorescent color discrimination signal DFn is set to be 0 in advance (602). The input color signal Dj is separated into one of the four systems, i.e., the YM system (603), the YC system (604), the Y system (605), and the M system (606) depending on the signs of respective components of the signal Dj. For example, if $Dy > 0$, $Dm > 0$, and $Dc \leq 0$ are all satisfied, it is determined that the input signal represents a color in the YM system.

More specifically, system separation of an input color is performed as follows. That is, when code bits of the color signal Dj are input to the decoder 501, for example, Dy is assigned to the most significant bit, and Dc is assigned to the least significant bit. In this case, assume that a signal obtained from the first output terminal of the four output terminals of the decoder 501 is represented by AR1, a signal obtained from the second output terminal is represented by AG1, a signal obtained from the third output terminal is represented by AY1, and a signal obtained from the fourth output terminal is represented by AM1. When the output signal AR1 from the decoder 501 is at H level, an input color is determined as the YM system; when the output signal AG1 is at H level, an input color is determined as the YC system; when the output signal AY1 is at H level, an input color is determined as the Y system; and when the output signal AM1 is at H level, an input signal is determined as the M system. In this manner, colors belonging to the four color systems are separated.

After color separation, when the fluorescent color degree function f exceeds the threshold value h in each system, the input color is determined as a fluorescent color, and the value of the fluorescent color discrimination signal DFn is set to be 1. For example, as a result of the color separation, if it is determined that the input color belongs to the YM system, a fluorescent color detection function fr is given by equation (11):

$$fr = |Dc/(Dy+Dm)| \tag{11}$$

When the function fr is larger than a threshold value hr of the YM system, it is determined that the input color is a fluorescent color of the YM system (607), and a value of its fluorescent color discrimination signal DFr is set to be 1 (608).

Similarly, when an input color belongs to the YC system (609, 610), the Y system (611, 612), or the M system (613, 614), the function fn is calculated by a corresponding one of the following equations, and only when the value of the function fn is larger than a corresponding threshold value hn, the value of the fluorescent color discrimination signal DFn is set to be 1.

$$fg = |Dm/(Dy+Dc)| \tag{12}$$

$$fy = |(Dm+Dc)/Dy| \tag{13}$$

$$fm = |(Dy+Dc)/Dm| \tag{14}$$

The fluorescent color detection processing is executed by the circuit shown in FIG. 18 in units of color systems, as follows. More specifically, Dy+Dm and Dc are input to the ROM 508. The ROM 508 searches a code bit of a value obtained by subtracting a function fr from a threshold value hr from a table stored in the ROM 508 using Dy+Dm and Dc as addresses.

Dy+Dc and Dm are input to the ROM 509. The ROM 509 searches a code bit of a value obtained by subtracting a function fg from a threshold value hg from a table stored in the ROM 509 using Dy+Dc and Dm as addresses.

Similarly, the ROM 510 obtains a code bit level of a value obtained by subtracting a function fy from a threshold value hy to detect a fluorescent color of the Y system, and the ROM 511 obtains a code bit level of a value obtained by subtracting a function fm from a threshold value hm to detect a fluorescent color of the M system.

If code bit level output signals from the ROM tables 508, 509, 510, and 511 are respectively AR2, AG2, AY2, and AM2, fluorescent color detection is performed based on these signals and the output signals AR1, AG1, AY1, and AM1 from the decoder 501. More specifically, if a logic product of the signals AR1 and AR2 is H level, a fluorescent color of the YM system is detected; if a logic product of the signals AG1 and AG2 is H level, a fluorescent color of the YC system is detected; if a logic product of the signals AY1 and AY2 is H level, a fluorescent color of the Y system is detected; and if a logic product of the signals AM1 and AM2 is H level, a fluorescent color of the M system is detected. Note that these logic products are obtained by the AND gates 512 to 515. The fluorescent color detection is executed, as described above, and the fluorescent color detection signals are supplied to the mark area detecting circuit 106.

Figure 20A:
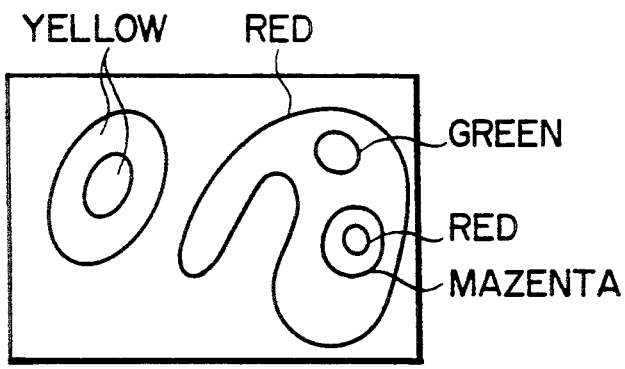
FIGS. 20A to 20E are views showing examples of areas designated by frame lines, and examples of separated color frame components.
Figure 20B:
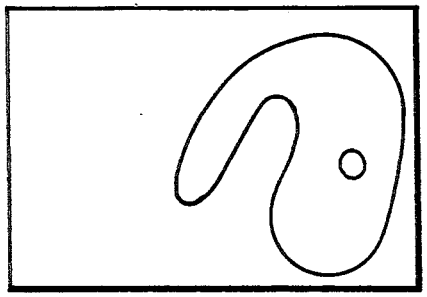
Figure 20C:
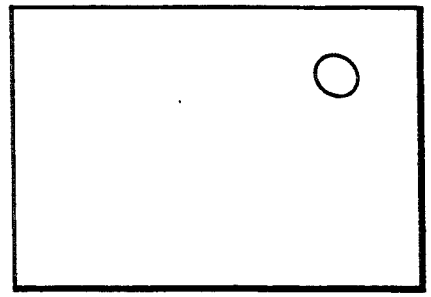
Figure 20D:
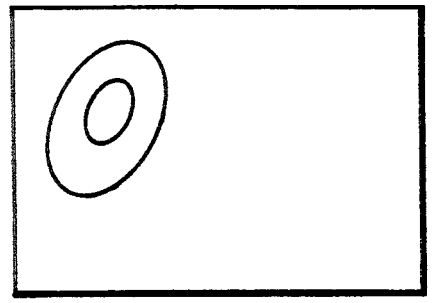
Figure 20E:
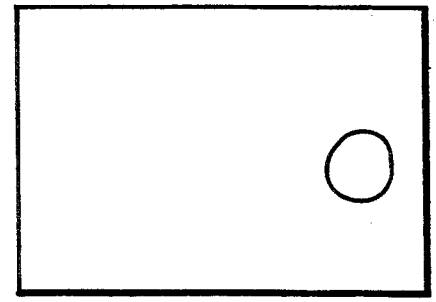

The mark area detecting circuit 106 executes logic sum processing with adjacent pixels, low-pass processing, and the like, and then, executes noise processing such as isolated point removal. The circuit 106 then detects an inner or outer portion of a color frame on the basis of the fluorescent color detection signal DFn output from the fluorescent color detecting circuit 105. In this embodiment, inner or outer portions of frames are independently detected in units of four color frames. For example, when an image including a plurality of frame line patterns shown in FIG. 20A is input, four line patterns of the red system (FIG. 20B), the green system (FIG. 20C), the yellow system (FIG. 20D), and the magenta system (FIG. 20E) are determined as monochromatic patterns, and are independently subjected to inner frame area detection.

Inner frame detection is performed by, e.g., the following method. More specifically, frame and background levels having values of integers equal to or larger than 0 are defined in a frame mark and a background portion (other than the frame), and frame and background levels of a present raster are determined on the basis of the frame and background levels of the previous raster and the positional relationship between frames and backgrounds of the previous and present rasters. In addition, an inner or outer portion of each frame is detected based on the determined background level.

This method will be described in detail below. A level of a background portion of the first raster of an image is set to be 0. A continuous background or frame of each raster is regarded as one unit, and the background and the frame are defined as a background portion and a frame portion. The levels of these portions are determined by the following rules in units of portions. More specifically, if a given background portion includes a background portion adjacent to the previous raster, a minimum one of the levels of the background portion of the previous raster is determined as the level of the given background portion; and if the given background portion includes no background portion adjacent to the previous raster, a level obtained by adding 1 to the level of a frame portion adjacent to the previous raster is determined as the level of the given background portion. If a given frame portion includes a frame portion adjacent to the previous raster, a maximum one of levels of the frame portion of the previous raster is determined as the level of the given frame portion; and if the given frame portion includes no frame portion adjacent to the previous raster, the level of a background portion adjacent to the previous raster is determined as the level of the given frame portion. With these rules, the levels of the frame and background portions of the respective rasters are sequentially determined. The determined background level is a value indicating an inner frame area position as the number of frames counted from an outermost frame, and the frame level serves as an auxiliary status variable for determining the background level. Therefore, an inner or outer portion of a frame can be detected by the value of the background level.

Figures 21A, 21B:
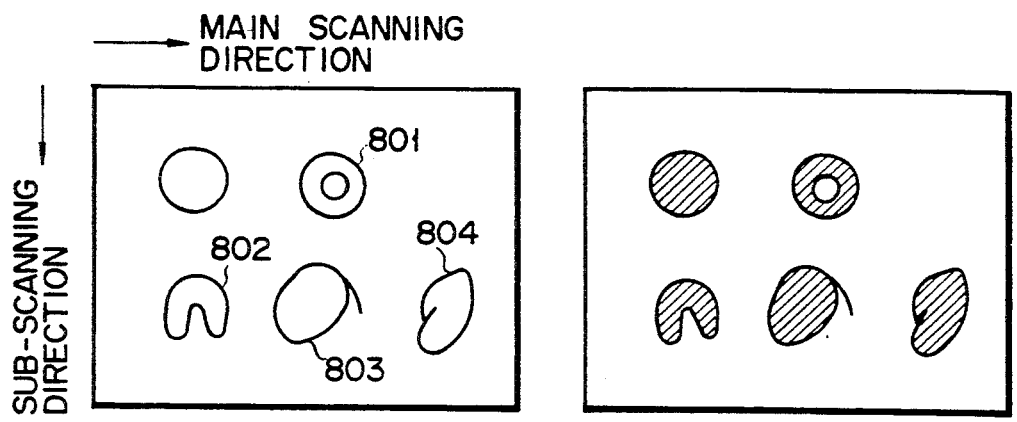
FIGS. 21A and 21B are views showing examples of detected inner frame areas in the image layout apparatus according to the present invention.

A detection example of inner frame areas according to this method will be described below with reference to FIGS. 21A and 21B. In FIG. 21A, solid curves represent frame lines. In FIG. 21B, hatched areas represent inner frame areas, solid curves represent significant areas, and broken curves represent non-significant areas. With this method, background levels having values of integers are defined in respective background portions, and inner and outer portions of frames are detected using these levels. Thus, double frames 801 and an inner frame area 802 defined by a frame line having a lower recess portion can be correctly detected. Even when so-called hair patterns are formed like in frame lines 803 and 804 due to hand-writing, no detection errors occur, and highly reliable inner frame detection can be realized. Note that a mark itself is processed as a portion outside an area.

Noise components generated in a normal color portion having a high saturation, which is erroneously discriminated as a fluorescent color, can be removed by performing the following processing. That is, even if a mark frame is detected as a fluorescent color, when the frame has no background inside, the corresponding frame is not determined as a mark frame.

In general, although most of commercially available fluorescent color marker pens adopt transparent inks, opaque fluorescent color marker pens are also commercially available. When a color image portion of, e.g., a photograph is to be laid out, such opaque fluorescent color marker pens are suitable.

A frame, and its inner and outer background portions must often be distinguished from each other depending on a layout content. For example, as typical processing, trimming is processing for leaving a background portion inside a mark frame, and masking is processing for leaving a background portion outside a mark frame.

When a marker pen portion is removed from a to-be-laid-out area, only background data is output to the image layout processing circuit 109. When a portion on a mark frame is included in a to-be-laid-out area, data on the frame and background data are output to the image layout processing circuit 109. In particular, in the latter case, when an area is designated using a transparent fluorescent marker pen, even when a frame overlaps a to-be-laid-out area, the to-be-laid-out area can be prevented from being locally omitted, and precise area designation can be performed. Such a difference in area designation mode is preferably changed upon an instruction from the CPU 112.

Color layout processing of an image in which an area is designated by a fluorescent color mark will be described below.

Figure 22:
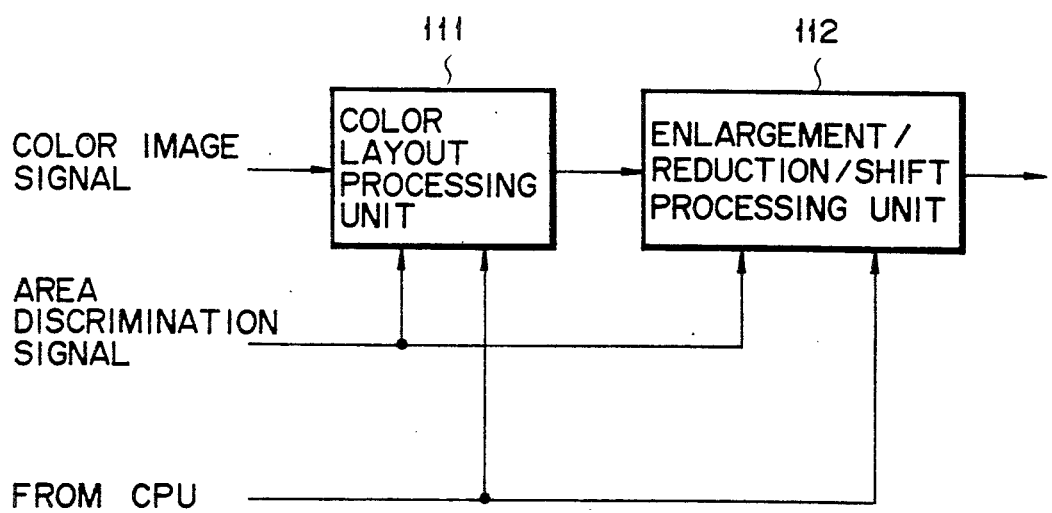
FIG. 22 is a block diagram of an image processing circuit.

FIG. 22 is a block diagram showing a schematic arrangement of the image layout processing circuit 109. The image layout processing circuit 109 comprises a color layout processing unit 111 and an enlargement/reduction/shift processing unit 112. The color layout processing unit 111 executes color change processing, trimming processing, masking processing, and the like of a color image signal on the basis of the area discrimination signal and an instruction signal from the CPU 112. On the other hand, the enlargement/reduction/shift processing unit 112 executes processing associated with a position (enlargement/reduction/shift processing) in accordance with the area discrimination signal and an instruction signal from the CPU 112. In this embodiment, in processing associated with a position in the main scanning direction as a read direction of the line sensor constituting the color scanner 101, write and read addresses of a line memory are changed to shift a position. Enlargement/reduction processing is realized by interpolation processing. Processing associated with a position in the sub-scanning direction as a moving direction of the line sensor is executed by moving a relative position between the scanner 101 and the printer 113 and changing a moving speed.

The color layout processing unit 111 comprises a matrix circuit, as shown in FIG. 23. More specifically, color image signals Ty, Tm, and Tc are input to selectors 1001, 1002, and 1003, respectively. These selectors 1001 to 1003 are switched in synchronism with the color image signals Ty, Tm, and Tc in accordance with a Ty, Tm, or Tc switching signal. Signals selected by these selectors 1001 to 1003 are input to multipliers 1004, 1005, and 1006, and are multiplied with contents of coefficient memories 1007, 1008, and 1009, respectively. These coefficients are designated by the control panel 110, and are loaded from the ROM 111 in the coefficient memories 1007, 1008, and 1009 upon an instruction from the CPU 112. These coefficients are selected according to the Ty, Tm, or Tc switching signal and the area discrimination signal, and are supplied to the multipliers 1004, 1005, and 1006. Products of the coefficients and the image signals are input to adders 1010, 1011, and 1012, and are fed to these adders 1010, 1011, and 1012 via delay elements 1013, 1014, and 1015. The adders 1010 to 1012 perform the following calculations, and output TTy, TTm, and TTc:

$$\begin{bmatrix} TTy \\ TTm \\ TTc \end{bmatrix} = \begin{bmatrix} a11 & a12 & a13 \\ a21 & a22 & a33 \\ a31 & a32 & a33 \end{bmatrix} \begin{bmatrix} Ty \\ Tm \\ Tc \end{bmatrix} \quad (15)$$

A detailed layout example will be explained below. Table 2 below summarizes contents of coefficients when trimming, masking, and color change are executed.

TABLE 2

| Layout Processing | | a11 | a12 | a13 | a21 | a22 | a23 | a31 | a32 | a33 |
|---|---|---|---|---|---|---|---|---|---|---|
| Trimming | Area 1 (Inside) | 1 | 0 | 0 | 0 | 1 | 0 | 0 | 0 | 1 |
| | Area 2 (Outside) | 0 | 0 | 0 | 0 | 0 | 0 | 0 | 0 | 1 |
| Masking | Area 1 (Inside) | 0 | 0 | 0 | 0 | 0 | 0 | 0 | 0 | 0 |
| | Area 2 (Outside) | 1 | 0 | 0 | 0 | 1 | 0 | 0 | 0 | 1 |
| Color Change (Convert Color Inside Area to M Color) | Area 1 (Inside) | 0 | 0 | 0 | ⅓ | ⅓ | ⅓ | 0 | 0 | 0 |
| | Area 2 (Outside) | 1 | 0 | 0 | 0 | 1 | 0 | 0 | 0 | 1 |
| Color Change (Convert Color Outside Area to Monochromatic Color) | Area 1 (Inside) | 1 | 0 | 0 | 0 | 1 | 0 | 0 | 0 | 1 |
| | Area 2 (Outside) | ⅓ | ⅓ | ⅓ | ⅓ | ⅓ | ⅓ | ⅓ | ⅓ | ⅓ |

For example, in a trimming mode, processing for directly outputting data inside an area, and inhibiting data outside the area from being output is executed. Therefore, the coefficients inside the area are set to be 0 except for a11=a22=33=1, and all the coefficients outside the area are set to be 0.

In a masking mode, processing for directly outputting data outside an area and erasing data inside the area is executed. Therefore, all the coefficients inside the area are set to be 0, and only coefficients a11, a22, and a33 outside the area are set to be 1.

When only data in an area are converted to a magenta (M) color, and other data are output in a color mode, the coefficients a21, a22, and a23 are set to be ⅓ in the area, and other coefficients are set to be 0. Only the coefficients a11, a22, and a33 outside the area are set to be 1.

When only data inside an area are output in a color mode, and data outside the area are output in a monochromatic mode, the coefficients a11, a22, and a33 inside the area are set to be 1, and all the coefficients outside the area are set to be ⅓.

In this manner, a color layout operation can be performed inside and outside a designated area. In this embodiment, TTy, TTm, and TTc are parallel-output. In a printer for performing a color printing operation in a frame sequential mode, TTy, TTm, and TTc need not be output at the same time. In this case, a circuit for one channel, i.e., the selector 1001, the multiplier 1004, the coefficient memory 1007, the adder 1010, and the delay element 1013 need only be prepared. In this case, the coefficient memory 1007 stores the contents of the coefficient memories 1008 and 1009, and contents are switched in synchronism with an output color signal.

The second embodiment of the present invention will be described below.

Figure 24:
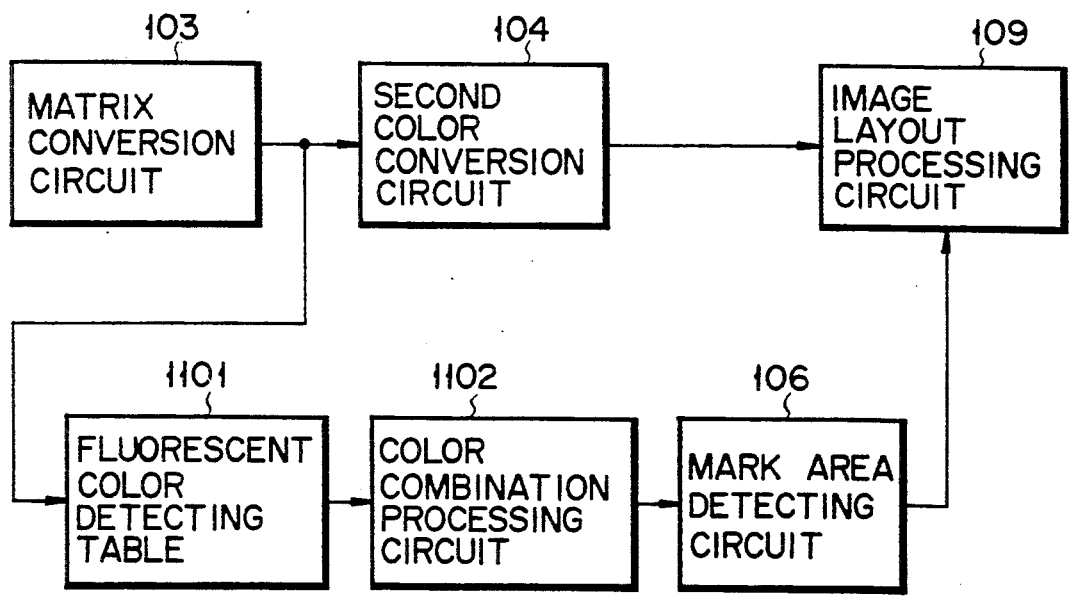
FIG. 24 is a block diagram of a main part of a color image layout apparatus according to still another embodiment of the present invention.

In this embodiment, the fluorescent color detecting circuit 105 in the first embodiment is replaced with a three-dimensional fluorescent color detecting table 1101 in which the number of address bits is limited, as shown in FIG. 24. The color scanner 101, the first color conversion circuit 102, and the matrix conversion circuit 103 are the same as those in the first embodiment. When a signal output from the matrix conversion circuit 103 has a negative value, it is determined as significant data, and is input to an address of the fluorescent color detecting table 1101. An address signal need only have about four bits to perform fluorescent color detection.

Figure 19:
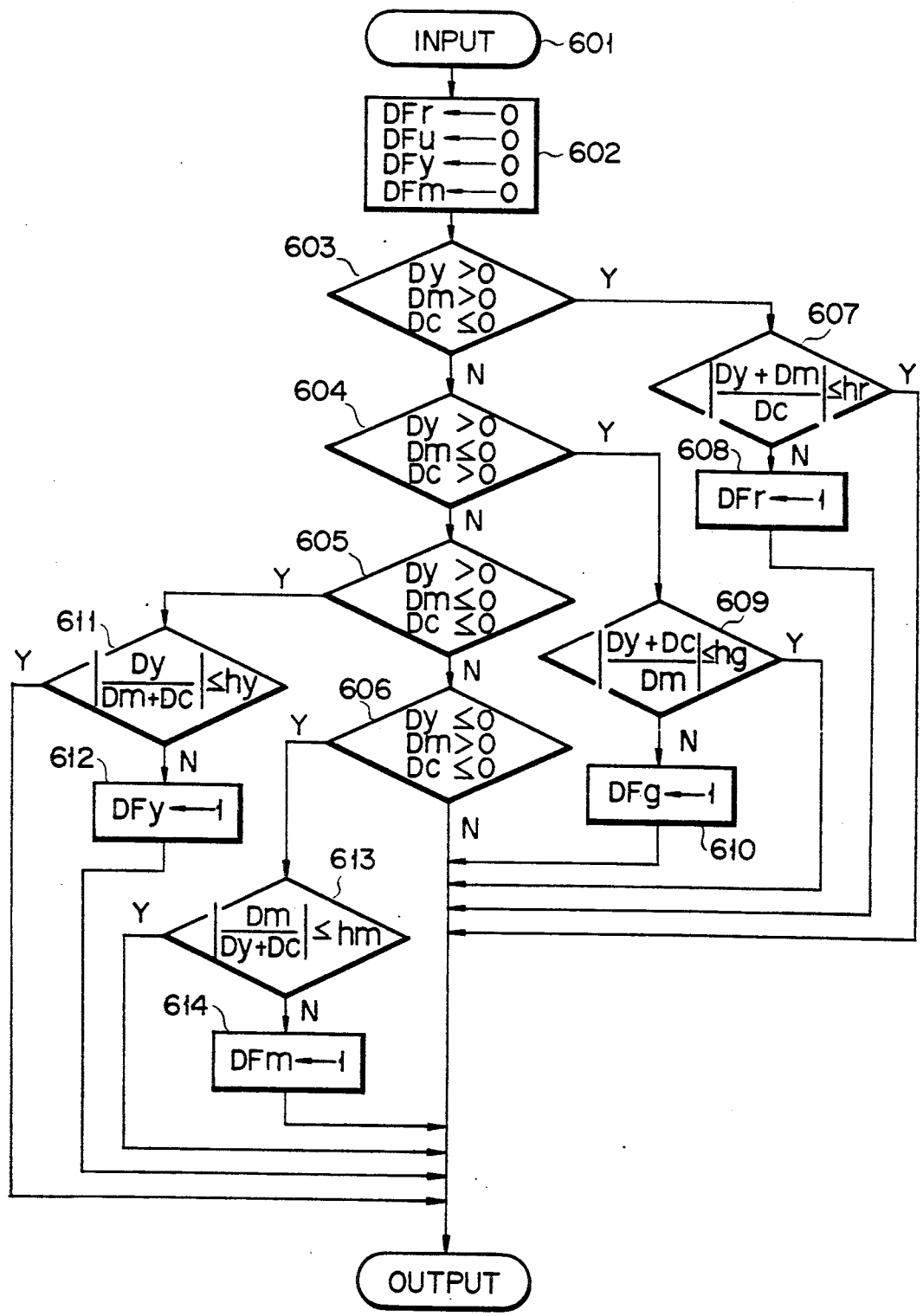
FIG. 19 is a flow chart showing a fluorescent color detection algorithm.

Note that the content of the table for detecting a fluorescent color can be determined based on a distribution of a histogram of data of many fluorescent colors and normal colors sampled by the scanner 101 in practice. Alternatively, the content of the table may be determined by calculations shown in FIG. 19.

The fluorescent color detecting table 1101 can output a normal color close to a fluorescent color as an adjacent color code. In this case, the next color combination processing circuit 1102 can combine a color signal of a normal color (code signal of an adjacent color), which is adjacent to and close to a fluorescent color, to the fluorescent color. In this manner, detection strong against a variation such as fainting of a fluorescent color marker can be realized. A fluorescent color signal detected in this manner is input to a mark area detecting circuit 106. The mark area detecting circuit 106 executes processing such as isolated point removal like in the first embodiment, and then executes area detection.

The mark area detecting circuit 106 outputs an area discrimination signal for differentiating a pixel which is determined as a predetermined area to an image layout processing circuit 109. Thereafter, the same layout processing as described above is executed, and the processing result is output by a printer.

Still another embodiment of the present invention will be described below with reference to FIG. 25. This embodiment is effective when a single-color fluorescent color marker is used for a black-and-white image or a two-color binary image.

In this apparatus, assume that a binary image which is printed in two colors e.g., red and black, and in which an area is designated using an M- or YM-system fluorescent color is input from a color scanner 101. In this case, color separation filters for three colors need not be prepared unlike in the embodiment shown in FIG. 14, and need only be prepared for two colors, i.e., R and G. Since a signal input from this scanner 101 includes a value exceeding 1, i.e., a light-emission component like in the embodiment shown in FIG. 14, a variation width of each signal is set to be about 1.5 to be able to directly process a signal of an input color having a reflectance larger than that of white.

Signal values SR and SG obtained from the scanner 101 are input to a color separation table 1201, and discrimination codes Cu and Cd are obtained using a combination of the signal values SR and SG as an address. The color separation table 1201 comprises two ROMs, and these ROMs output 0 or 1 according to values of the input signals SR and SG. The discrimination codes Cu and Cd are respectively 1-bit signals. These signals Cu and Cd are separated into signal values in units of colors by a binary decoder 1202. In this case, colors corresponding to output terminals are as follows. That is, 0 corresponds to a non-pixel; 1, a black pixel; 2, a red pixel; and 3, a mark. The decoder 1202 supplies, to an image layout processing circuit 109, input signals Tr and Tk of red and black inks for a printer 113, which signals are used when no layout processing is executed. The decoder 1202 supplies a mark signal D to a mark area detecting circuit 106.

A fluorescent color mark portion, a black pixel portion, a red pixel portion, and a non-pixel portion on an original are detected by the magnitudes of the values of the signals SR and SG. For example, when the signal SR exceeds 1 and the signal SG is equal to or smaller than 0.5, a fluorescent color mark is determined. Note that in order to prevent an image signal from being mixed with noise in threshold value processing for detecting a fluorescent color, threshold value processing is executed such that an image signal includes a fluorescent color. Furthermore, like in the above embodiment, layout processing is executed using the area discrimination signal, thus reducing noise.

The mark area detecting circuit 106 extracts an area designated by a fluorescent color marker from the detected mark portion in the same manner as in the embodiments shown in FIGS. 14 and 24. Note that the mark portion corresponds to a portion outside the area like in the above embodiments. An area signal P is set to be 0 if it represents a portion inside an area.

The signals Tj and the area signal P are input to the image layout processing circuit 109, and are subjected to layout processing. For example, when the area signal P is directly multiplied with the signals Tj, only data inside the area can be erased. Since the layout processing is the same as that in the above embodiments, a detailed description thereof will be omitted.

According to this embodiment, area designation of an image having one color in addition to black can be performed while simplifying a circuit as compared to the embodiment shown in FIG. 14.

According to the embodiments shown in FIGS. 14 to 25, since a fluorescent color portion is detected from a signal obtained by reading a color original by utilizing a unique nature of a fluorescent color, a normal color portion and a mark portion can be distinguished from each other without performing a prescanning operation using a special light source. Therefore, layout processing of a color image having gradation can be performed. For example, even when fluorescent color markers such as yellow- and green-system fluorescent color markers which cannot be easily separated from a normal color are used to designate an area, these fluorescent colors can be satisfactorily detected according to the features of the fluorescent colors, and layout processing can be performed for areas designated by these markers.

An image subjected to color image processing is color-converted independently of fluorescent color detection, and color image layout processing is executed for only an area-discriminated signal as an object designated by a marker. For this reason, even when a color image in a normal color close to a fluorescent color is to be processed, noise processing is executed in marker discrimination processing, thus reducing noise from an area discrimination signal. Therefore, color image layout can be performed while minimizing noise.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image layout apparatus for recognizing a mark selectively recorded on an original image and automatically laying out the original image, comprising:
   image signal outputting means for outputting an image signal corresponding to the original image including the mark;
   mark separating means for separating a mark image signal corresponding to the mark from the image signal;
   to-be laid-out image signal outputting means for extracting an original image signal corresponding to an original image, and outputting the original image signal as a to-be-laid-out image signal; and
   layout processing mean for performing predetermined layout processing of the to-be-laid-out image signal in accordance with the mark image signal.

2. An apparatus according to claim 1, wherein the mark is a color mark, said image signal outputting means comprises color conversion means for converting RGB image signal corresponding to the original image and the color mark into YMC image signals, and outputting the YMC image signals to said to-be-laid-out image signal outputtinq means, and said mark separation means comprises means for separating an image signal corresponding to a color of the color mark from the YMC image signals.

3. An apparatus according to claim 2, wherein said to-be-laid-out image signal outputting means comprises means for performing arithmetic processing of the YMC image signals to discriminate the original image signal and the mark image signal from each other, and out-putting the to-be-laid-out image signal defined by the mark image signal.

4. An apparatus accordinq to claim 1, wherein said layout processing means includes means for performing coloring layout processing of the to-be-laid-out image signal output from said to-be-laid-out image signal outputting means.

5. An apparatus according to claim 1, further including means for performing correction processing of the to-be-laid-out image signal so as to improve image quality of an image corresponding to the to-be-laid-out image signal.

6. An apparatus according to claim 1, further comprising inner frame area detecting means for receiving the mark image signal separated by said mark separating means, and detecting an inner frame area enclosed by the mark corresponding to the mark image signal.

7. An apparatus according to claim 1, further comprising noise removal means for removing noise from the mark image signal, and means for performing image quality improving processing of the to-be-laid out image signal in accordance with the mark image signal from which the noise is removed, and wherein said layout processing means performs the layout processing of the to-be-laid-out image signal which is subjected to the image quality improving processing.

8. An apparatus according to claim 1, wherein the mark image signal is a code signal representing a color, and the to-be-laid-out image signal is a multi-value image signal output from said image signal outputting means and corresponding to a density or chromaticity of a to-be-laid-out portion of the original image. the code signal and the multi-value image signal being non-exclusive signals.

9. An apparatus according to claim 1, wherein said layout processing means comprises means for detecting a frame line signal corresponding to a frame line of the mark from the mark image signal, means for dividing the image signal into a plurality of image signals corresponding to a plurality areas in accordance with the detected frame line signal, and means for performing the layout processing of the divided image signals in units of divided areas.

10. An image layout apparatus for recognizing a fluorescent color mark selectively recorded on a color original image and automatically laying out the original image, comprising:
    reading means for reading the color image and outputting color image signals;
    color conversion means for converting the color image signals output from said reading means into color signals for reproducing the color image;
    fluorescent color detecting means for detecting a fluorescent image signal corresponding to the fluorescent color mark from the color image signals;
    area discriminating means for discriminating an area designated on the color original image on the basis of the fluorescent color mark detected by said fluorescent color detecting means; and
    image layout processing means for performing image layout processing of the color signals for the discriminated area, the image processing being different from that for other areas.

11. An apparatus according to claim 10, wherein said fluorescent color detecting means includes means for detecting the fluorescent color mark on the basis of a signal indicating a negative value in a color conversion output signal by masking processing.

12. An apparatus according to claim 10, wherein said area discriminating means includes noise removal means for removing a noise component from the fluorescent color mark signal detected by said fluorescent color detecting means, and means for detecting, as a discriminated area, an original area corresponding to the fluorescent color mark signal from which the noise component is removed by said noise removal means.

* * * * *